US012229920B2

(12) United States Patent
Liang et al.

(10) Patent No.: US 12,229,920 B2
(45) Date of Patent: Feb. 18, 2025

(54) SYSTEMS, METHODS, AND APPARATUSES FOR IMPLEMENTING FIXED-POINT IMAGE-TO-IMAGE TRANSLATION USING IMPROVED GENERATIVE ADVERSARIAL NETWORKS (GANS)

(71) Applicant: Arizona Board of Regents on behalf of Arizona State University, Scottsdale, AZ (US)

(72) Inventors: Jianming Liang, Scottsdale, AZ (US); Zongwei Zhou, Tempe, AZ (US); Nima Tajbakhsh, Los Angeles, CA (US); Md Mahfuzur Rahman Siddiquee, Tempe, AZ (US)

(73) Assignee: Arizona Board of Regents on Behalf of Arizona State University, Scottsdale, AZ (US)

( * ) Notice: Subject to any disclaimer, the term of this patent is extended or adjusted under 35 U.S.C. 154(b) by 412 days.

(21) Appl. No.: 17/477,088

(22) Filed: Sep. 16, 2021

(65) Prior Publication Data
US 2022/0084173 A1   Mar. 17, 2022

Related U.S. Application Data

(60) Provisional application No. 63/079,821, filed on Sep. 17, 2020.

(51) Int. Cl.
*G06T 5/50* (2006.01)
*G06T 7/00* (2017.01)

(52) U.S. Cl.
CPC ............. *G06T 5/50* (2013.01); *G06T 7/0012* (2013.01); *G06T 2207/20081* (2013.01); *G06T 2207/20084* (2013.01); *G06T 2207/20224* (2013.01)

(58) Field of Classification Search
CPC ............. G06T 5/50; G06T 7/0012; G06T 2207/20081; G06T 2207/20084;
(Continued)

(56) References Cited

U.S. PATENT DOCUMENTS 10,314,477 B1 * 6/2019 Goodsitt .............. H04N 1/6088
2018/0218261 A1 * 8/2018 Myara .................... G06N 3/045
(Continued)

OTHER PUBLICATIONS

M. M. R. Siddiquee et al., "Learning Fixed Points in Generative Adversarial Networks: From Image-to-Image Translation to Disease Detection and Localization," 2019 IEEE/CVF International Conference on Computer Vision (ICCV), Seoul, Korea (South), 2019, pp. 191-200, doi: 10.1109/ICCV.2019.00028. (Year: 2019).*
(Continued)

*Primary Examiner* — Kathleen Y Dulaney
(74) *Attorney, Agent, or Firm* — Elliott, Ostrander & Preston, P.C.

(57) ABSTRACT

Described herein are means for implementing fixed-point image-to-image translation using improved Generative Adversarial Networks (GANs). For instance, an exemplary system is specially configured for implementing a new framework, called a Fixed-Point GAN, which improves upon prior known methodologies by enhancing the quality of the images generated through global, local, and identity transformation. The Fixed-Point GAN as introduced and described herein, improves many applications dependant on image-to-image translation, including those in the field of medical image processing for the purposes of disease detection and localization. Other related embodiments are disclosed.

20 Claims, 25 Drawing Sheets

(58) Field of Classification Search
CPC .......... G06T 2207/20224; G06T 11/60; G06N 3/045; G06N 3/047; G06N 3/084
USPC ................................................. 382/159, 128
See application file for complete search history.

(56) References Cited

U.S. PATENT DOCUMENTS

| | | | | |
|---|---|---|---|---|
| 2020/0183035 | A1* | 6/2020 | Liu | G06N 20/00 |
| 2020/0364477 | A1* | 11/2020 | Rahman Siddiquee | |
| | | | | G06F 18/214 |
| 2021/0012486 | A1* | 1/2021 | Huang | G06N 3/047 |
| 2021/0158970 | A1* | 5/2021 | Graf | G06T 11/00 |
| 2021/0192343 | A1* | 6/2021 | Hwang | G06T 7/168 |
| 2023/0108319 | A1* | 4/2023 | Narayanaswamy | G06V 10/82 |
| | | | | 382/156 |

OTHER PUBLICATIONS

X. Wu, J. Shao, L. Gao and H. T. Shen, "Unpaired Image-to-Image Translation from Shared Deep Space," 2018 25th IEEE International Conference on Image Processing (ICIP), Athens, Greece, 2018, pp. 2127-2131, doi: 10.1109/ICIP.2018.8451250. (Year: 2018).*
M. Rezaei, H. Yang and C. Meinel, "Generative Adversarial Framework for Learning Multiple Clinical Tasks," 2018 Digital Image Computing: Techniques and Applications (DICTA), Canberra, ACT, Australia, 2018, pp. 1-8. (Year: 2018).*
Y. Sun, G. Yang, D. Ding, G. Cheng, J. Xu and X. Li, "A GAN-based Domain Adaptation Method for Glaucoma Diagnosis," 2020 International Joint Conference on Neural Networks (IJCNN), Glasgow, UK, 2020, pp. 1-8. (Year: 2020).*
Zhang, X. et al., "Adversarial complementary learning for weakly supervised object localization," Proceedings of the IEEE Conference on Computer Vision and Pattern Recognition, 2018, pp. 1325-1334.
Zhao, Y. et al., "Unpaired image-to-image translation using adversarial consistency loss," arXiv preprint arXiv:2003.04858, 2020.
Zhou, B. et al., "Learning deep features for discriminative localization," Proceedings of the IEEE Conference on Computer Vision and Pattern Recognition, 2016, pp. 2921-2929.
Zhou, Z. et al., "Fine-tuning convolutional neural networks for biomedical image analysis: actively and incrementally," Proceedings of the IEEE conference on computer vision and pattern recognition, 2017.
Zhu, J.Y. et al., "Toward multimodal image-to-image translation," Advances in Neural Information Processing Systems, 2017, pp. 465-476.
Zhu, J.Y. et al., "Unpaired image-to-image translation using cycle-consistent adversarial networks," Proceedings of the IEEE international conference on computer vision, 2017, pp. 2223-2232.
Zhuang, X. et al., "A registration-based propagation framework for automatic whole heart segmentation of cardiac MRI," IEEE transactions on medical imaging, 29(9), 2010, pp. 1612-1625.
Zhuang, X. et al., "Multiatlas whole heart segmentation of CT data using conditional entropy for atlas ranking and selection," Medical physics 42(7), 2015, pp. 3822-3833.
Zhuang, X. et al., "Multi-scale patch and multi-modality atlases for whole heart segmentation of MRI," Medical image analysis 31, 2016, pp. 77-87.
Zhuang, X.: Challenges and methodologies of fully automatic whole heart segmentation: a review, J. Healthc. Eng., 4.3, 2013, pp. 371-408.
Alex, V. et al., "Generative adversarial networks for brain lesion detection," Medical Imaging 2017: Image Processing, vol. 10133, 2017, SPIE.
Arjovsky, M. et al., "Wasserstein generative adversarial networks," International Conference on Machine Learning, 2017, pp. 214-223, PMLR.
Bai, W. et al., "Semisupervised learning for network-based cardiac MR image segmentation," Medical Image Computing and Computer-Assisted Intervention—MICCAI 2017: 20th International Conference, Quebec City, QC, Canada, Sep. 11-13, 2017, Proceedings, Part II 20, 2017, pp. 253-260, Springer International Publishing.
Baumgartner, C.F. et al., "Visual feature attribution using wasserstein gans," Proceedings of the IEEE conference on computer vision and pattern recognition, 2018, pp. 8309-8319.
Cai, J. et al., "Iterative attention mining for weakly supervised thoracic disease pattern localization in chest x-rays," Medical Image Computing and Computer Assisted Intervention—MICCAI 2018: 21st International Conference, Granada, Spain, Sep. 16-20, 2018, Proceedings, Part II 11, 2018, pp. 589-598, Springer International Publishing.
Chang, H. et al., "Pairedcyclegan: Asymmetric style transfer for applying and removing makeup," 2018 IEEE Conference on Computer Vision and Pattern Recognition, 2018, pp. 40-48.
Chen, X. et al., "Unsupervised detection of lesions in brain MRI using constrained adversarial auto-encoders," arXiv preprint arXiv:1806.04972, 2018.
Choi, Y. et al., "Stargan v2: Diverse image synthesis for multiple domains," Proceedings of the IEEE/CVF Conference on Computer Vision and Pattern Recognition, 2020, pp. 8188-8197.
Choi, Y. et al., "Stargan: Unified generative adversarial networks for multi-domain image-to-image translation,". Proceedings of the IEEE Conference on Computer Vision and Pattern Recognition, 2018, pp. 8789-8797.
Dong, X. et al., "Synthetic MRI-aided multi-organ segmentation on male pelvic CT using cycle consistent deep attention network," Radiotherapy and Oncology, 141, 2019, pp. 192-199.
Goodfellow, I. et al., "Generative adversarial nets," Advances in neural information processing systems, 27, 2014, pp. 2672-2680.
Gulrajani, I. et al., "Improved training of wasserstein gans," Advances in Neural Information Processing Systems, 30, 2017, pp. 5767-5777.
He, G. et al., "Classification-aware semi-supervised domain adaptation," Proceedings of the IEEE/CVF Conference on Computer Vision and Pattern Recognition Workshops, 2020, pp. 964-965.
He, G. et al., "Image2audio: Facilitating semi-supervised audio emotion recognition with facial expression image," Proceedings of the IEEE/CVF Conference on Computer Vision and Pattern Recognition Workshops, 2020, pp. 912-913.
He, K. et al., "Deep residual learning for image recognition," Proceedings of the IEEE Conference on Computer Vision and Pattern Recognition, 2016, pp. 770-778.
He, Z. et al., "Attgan: Facial attribute editing by only changing what you want," IEEE Transactions on Image Processing 28(11), 2019, pp. 5464-5478.
Hwang, S. et al., "Self-transfer learning for weakly supervised lesion localization," Medical Image Computing and Computer-Assisted Intervention—MICCAI 2016: 19th International Conference, Athens, Greece, Oct. 17-21, 2016, Proceedings, Part II 19, 2016, pp. 239-426, Springer International Publishing.
Isola, P. et al., "Image-to-image translation with conditional adversarial networks," arXiv preprint arXiv:1611.07004, 2016.
Isola, P. et al., "Image-to-image translation with conditional adversarial networks," Proceedings of the IEEE conference on computer vision and pattern recognition, 2017, pp. 1125-1134.
Kim, T. et al., "Learning to discover cross-domain relations with generative adversarial networks," International Conference on Machine Learning, 2017, pp. 1857-1865.
Kistler, M. et al., "The virtual skeleton database: an open access repository for biomedical research and collaboration," Journal of Medical Internet Research, 15(11), 2013, e245.
Ledig, C. et al., "Photo-realistic single image super-resolution using a generative adversarial network," Proceedings of the IEEE conference on computer vision and pattern recognition, 2017, pp. 4681-4690.
Li, C. et al., "Precomputed real-time texture synthesis with markovian generative adversarial networks," Computer Vision-ECCV 2016: 14th European Conference, Amsterdam, The Netherlands, Oct. 11-14, 2016, Proceedings, Part III 14, 2016, Springer International Publishing.

(56) References Cited

OTHER PUBLICATIONS

Li, Z. et al., "Thoracic disease identification and localization with limited supervision," Proceedings of the IEEE Conference on Computer Vision and Pattern Recognition, 2018, pp. 8290-8299.

Liang, J. et al., "Computer aided detection of pulmonary embolism with tobogganing and mutiple instance classification in CT pulmonary angiography," Biennial International Conference on Information Processing in Medical Imaging., 2007, Springer Berlin Heidelberg.

Liu, M. et al., "A unified selective transfer network for arbitrary image attribute editing," Proceedings of the IEEE/CVF conference on computer vision and pattern recognition, 2019, pp. 3673-3682.

Liu, M.Y. et al., "Unsupervised image-to-image translation networks," Advances in Neural Information Processing Systems, 30, 2017.

Liu, Z. et al., "Deep learning face attributes in the wild," Proceedings of the IEEE International Conference on Computer Vision, 2015, pp. 3730-3738.

Mejjati, Y.A. et al., "Unsupervised attention-guided image-to-image translation," Advances in Neural Information Processing Systems, 31, 2018.

Menze, B.H. et al., "The multimodal brain tumor image segmentation benchmark (BRATS)," IEEE transactions on medical imaging 34(10), 2014, pp. 1993-2024.

Murez, Z. et al., "Image to image translation for domain adaptation," Proceedings of the IEEE Conference on Computer Vision and Pattern Recognition, 2018, pp. 4500-4509.

Nizan, O. et al., "Breaking the cycle-colleagues are all you need," Proceedings of the IEEE/CVF Conference on Computer Vision and Pattern Recognition, 2020, pp. 7860-7869.

Oquab, M. et al., "Is object localization for free ?- weakly-supervised learning with convolutional neural networks," Proceedings of the IEEE Conference on Computer Vision and Pattern Recognition, 2015, pp. 685-694.

Pinheiro, P.O. et al., "From image-level to pixel-level labeling with convolutional networks," Proceedings of the IEEE Conference on Computer Vision and Pattern Recognition, 2015, pp. 1713-1721.

Rahman Siddiquee, M.M. et al., "Learning fixed points in generative adversarial networks: From image-to-image translation to disease detection and localization," Proceedings of the IEEE/CVF international conference on computer vision, 2019, pp. 191-200.

Sandfort, V. et al., "Data augmentation using generative adversarial networks (cycleGAN) to improve generalizability in CT segmentation tasks," Scientific reports 9(1), 2019, 16884.

Schlegl, T. et al., "f-AnoGAN: Fast unsupervised anomaly detection with generative adversarial networks," Medical Image Analysis, 2019, pp. 30-44.

Selvaraju, R.R. et al., "Grad-cam: Visual explanations from deep networks via gradient-based localization," Proceedings of the IEEE International Conference on Computer Vision, 2017, pp. 618-626.

Shen, W. et al., "Learning residual images for face attribute manipulation," Proceedings of the IEEE conference on computer vision and pattern recognition, 2017, pp. 4030-4038.

Shin, S.Y. et al., "Joint weakly and semi-supervised deep learning for localization and classification of masses in breast ultrasound images," IEEE transactions on medical imaging, 38(3), 2018, pp. 762-774.

Simonyan, K. et al., "Deep inside convolutional networks: Visualising image classification models and saliency maps," arXiv preprint arXiv:1312.6034, 2013.

Singh, K.K. et al., "Hide-and-seek: Forcing a network to be meticulous for weakly-supervised object and action localization," Proceedings of the IEEE international conference on computer vision, 2017, pp. 3524-3533.

Tajbakhsh, N. et al., "Computer-aided detection and visualization of pulmonary embolism using a novel, compact, and informative image representation," Medical Image Analysis, 58, 2019, 101541.

Tajbakhsh, N. et al., "Computer-aided pulmonary embolism detection using a novel vessel-aligned multiplanar image representation and convolutional neural networks," Medical Image Computing and Computer-Assisted Intervention--MICCAI 2015: 18th International Conference, Munich, Germany, Oct. 5-9, 2015, Proceedings, Part II 18, 2015, pp. 62-29, Springer International Publishing.

Tajbakhsh, N. et al., "Convolutional neural networks for medical image analysis: Full training or fine tuning?," IEEE transactions on medical imaging 35(5), 2016, pp. 1299-1312.

Tang, Y. et al., "Attention-guided curriculum learning for weakly supervised classification and localization of thoracic diseases on chest radiographs," Machine Learning in Medical Imaging: 9th International Workshop, MLMI 2018, Held in Conjunction with MICCAI 2018, Granada, Spain, Sep. 16, 2018, Proceedings 9, 2018, pp. 249-258, Springer International Publishing.

Wang, X. et al., "Chestx-ray8: Hospital-scale chest x-ray database and benchmarks on weakly-supervised classification and localization of common thorax diseases," Proceedings of the IEEE Conference on Computer Vision and Pattern Recognition, 2017, pp. 2097-2106.

Wolterink, J.M. et al., "Deep MR to CT synthesis using unpaired data," Simulation and Synthesis in Medical Imaging: Second International Workshop, SASHIMI 2017, Held in Conjunction with MICCAI 2017, Québec City, QC, Canada, Sep. 10, 2017, Proceedings 2, 2017, pp. 14-23, Springer International Publishing.

Yi, Z. et al., "Dualgan: Unsupervised dual learning for image-to-image translation," Proceedings of the IEEE international conference on computer vision, 2017, pp. 2849-2857.

Zhang, G. et al., "Generative adversarial network with spatial attention for face attribute editing," Proceedings of the European conference on computer vision (ECCV), 2018, pp. 417-432.

* cited by examiner

Table 1 - 301

| | Loss | Definition |
|---|---|---|
| Eq. 1 | $\mathcal{L}_{adv}^{D}$ | $= \mathbb{E}_{x,c}[D_{real/fake}(G(x,c))] - \mathbb{E}_{x}[D_{real/fake}(x)]$ |
| Eq. 2 | $\mathcal{L}_{domain}^{D}$ | $= \mathbb{E}_{x,c_x}[\log D_{domain}(c_x|x)]$ |
| Eq. 3 | $\mathcal{L}_{adv}^{G}$ | $= -\sum_{c \in \{c_x,c_y\}} \mathbb{E}_{x,c}[D_{real/fake}(G(x,c))]$ |
| Eq. 4 | $\mathcal{L}_{domain}^{G}$ | $= \sum_{c \in \{c_x,c_y\}} \mathbb{E}_{x,c}[-\log D_{domain}(c|G(x,c))]$ |
| Eq. 5 | $\mathcal{L}_{cyc}$ | $= \sum_{c \in \{c_x,c_y\}} \mathbb{E}_{x,c,c_x}[\|G(G(x,c),c_x) - x\|_1]$ |
| Eq. 6 | $\mathcal{L}_{id}$ | $= \mathbb{E}_{x,c}[\|G(x,c) - x\|_1]$ if $c = c_x$; 0 otherwise |
| Eq. 7 | $\mathcal{L}_{D}$ | $= \mathcal{L}_{adv}^{D} + \lambda_{domain}\mathcal{L}_{domain}^{D}$ |
| Eq. 8 | $\mathcal{L}_{G}$ | $= \mathcal{L}_{adv}^{G} + \lambda_{domain}\mathcal{L}_{domain}^{D} + \lambda_{cyc}\mathcal{L}_{cyc} + \lambda_{id}\mathcal{L}_{id}$ |

FIG. 3D

Table 2 - 401

| Images from | Cross-domain (Acc.) | Same-domain ($L_1$) |
|---|---|---|
| Real images | 94.5% | - |
| Autoencoder | - | 0.11±0.09 |
| Fixed-Point GAN | 92.31% | 0.36±0.35 |
| StarGAN | 90.82% | 2.40±1.24 |

FIG. 4B

Table 3 - 501

| Method | Out-of-Distribution Data | |
|---|---|---|
| | CT (Dice) | MR (Dice) |
| No augmentation | 77.77±2.18 | 75.34±2.50 |
| StarGAN | 79.01±3.13 | 78.20±1.38 |
| + patch-level domain cls. | 79.79±2.97 | 78.24±1.24 |
| + fixed-point translation | 84.55±2.60 | 78.42±2.23 |

FIG. 5B

Table 4 - 701

| Dataset | Image-Level Detection (AUC) | | | Lesion-Level Loc. Sensitivity at 1 False Positive | | |
|---|---|---|---|---|---|---|
| | StarGAN | w/ Delta | w/ Fixed-Point Translation | w/ Both | StarGAN | w/ Fixed-Point Translation | w/ Both |
| BRATS | 0.4611 | 0.5246 | 0.9980 | 0.9831 | 13.6% | 81.2% | 84.5% |
| PE | 0.8832 | 0.8603 | 0.9216 | 0.9668 | 88.9% | 94.4% | 97.2% |

FIG. 7D

Table 5 - 702

| Dataset | $\lambda_{domain}$ | $\lambda_{cyc}$ | $\lambda_{id}$ | Iterations |
|---|---|---|---|---|
| CelebA | 1 | 10 | 10 | 200K |
| MM-WHS | 1 | 10 | 10 | 20K |
| BRATS 2013 | 1 | 10 | 0.1 | 300K |
| PE | 1 | 10 | 1 | 200K |

FIG. 7E

C. Learn CT/MR mapping using GAN

D. Generate MR images from CT images

E. Train a segmentation model with real CT and generated MR images

F. U-Net DA model from E now segments MR images better

901

SCENARIO 2 (with GAN) - 905B

Better Approach: Augmentation using GAN

I. Learn CT/MR mapping using GAN

J. Generate CT images from MR images

K. Train a segmentation model with real MR and generated CT images

L. U-Net DA model from K now segments CT images better

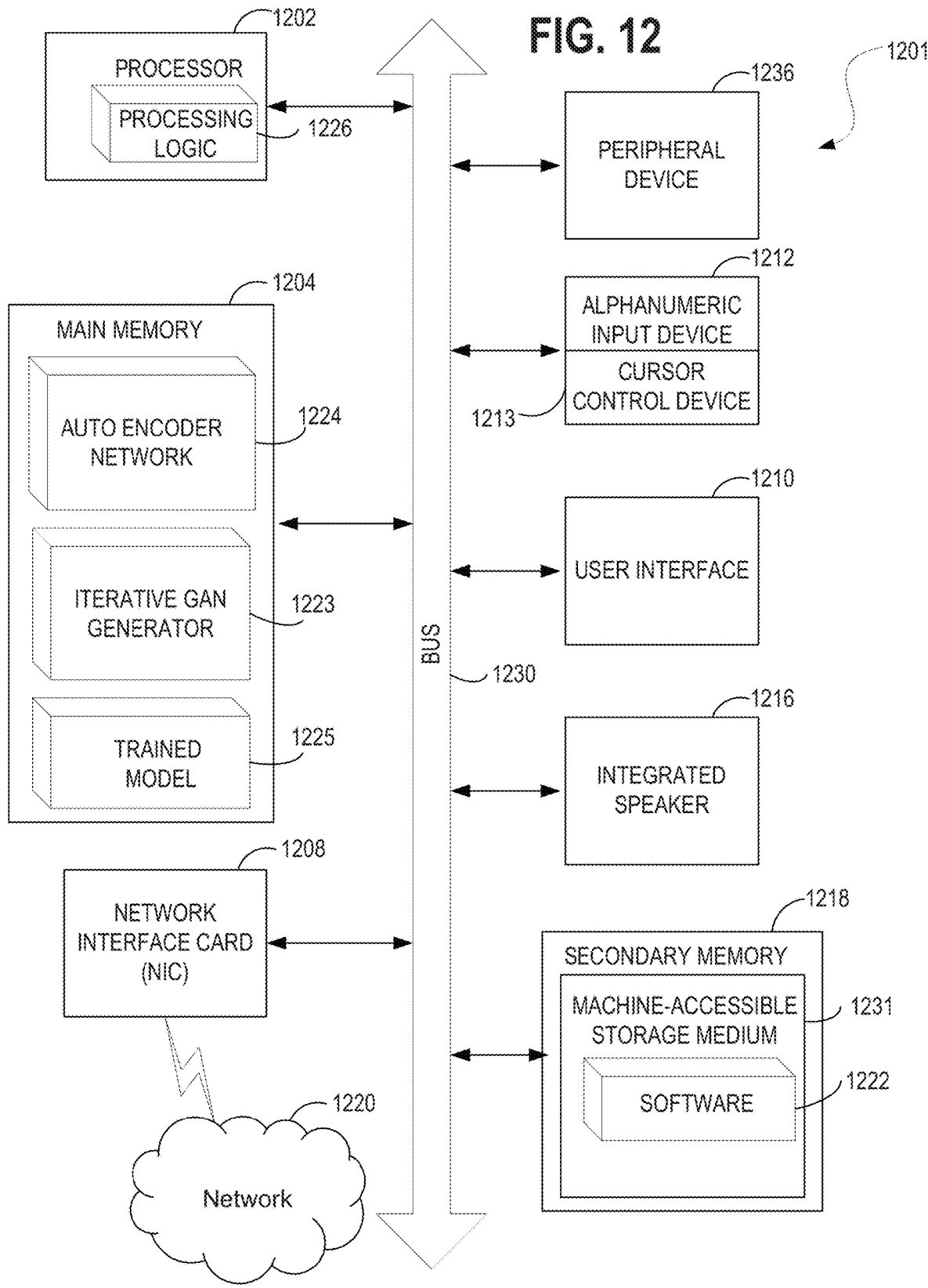

… (1)

SYSTEMS, METHODS, AND APPARATUSES FOR IMPLEMENTING FIXED-POINT IMAGE-TO-IMAGE TRANSLATION USING IMPROVED GENERATIVE ADVERSARIAL NETWORKS (GANS)

CLAIM OF PRIORITY

This non-provisional U.S. Utility Patent Application is related to, and claims priority to the U.S. Provisional Patent Application No. 63/079,821, entitled "SYSTEMS, METHODS, AND APPARATUSES FOR IMPLEMENTING FIXED-POINT IMAGE-TO-IMAGE TRANSLATION USING IMPROVED GENERATIVE ADVERSARIAL NETWORKS (GANS)," filed Sep. 17, 2020, the entire contents of which are incorporated herein by reference.

GOVERNMENT RIGHTS AND GOVERNMENT AGENCY SUPPORT NOTICE

This invention was made with government support under R01 HL128785 awarded by the National Institutes of Health. The government has certain rights in the invention.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments of the invention relate generally to the field of medical imaging and analysis using machine learning models, and more particularly, to systems, methods, and apparatuses for implementing fixed-point image-to-image translation using improved Generative Adversarial Networks (GANs).

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to embodiments of the claimed inventions.

Machine learning models have various applications to automatically process inputs and produce outputs considering situational factors and learned information to improve output quality. One area where machine learning models, and neural networks in particular, provide high utility is in the field of processing medical images.

The use of Generative adversarial networks (GANs) have proven to be powerful for image-to-image translation in non-medical applications, such as changing the hair color of a human subject, altering facial expressions, adding makeup of a person, etc. Some limited medical specific applications have also been explored, such as converting MRI scans to CT scans for radiotherapy planning.

A generative adversarial network (GAN) is a specific class of machine learning frameworks in which two neural networks contest with each other in the form of a zero-sum game, such that gains by one of the two neural networks correlates to a loss by the other.

Given a training set, a GAN type machine learning model learns to generate new data with the same statistics as the training set. For example, a GAN type model trained on photographs will generate new photographs that look at least superficially authentic to the training photographs.

Notwithstanding these advancements, there remains a need for improved processing of applications dependant upon on image-to-image translation, especially in the field of medical image processing. For instance, there is a specific need for improved disease detection and localization from patient medical images.

A new framework is introduced herein, called a Fixed-Point GAN, which outperforms prior-known image-to-image translation methodologies by enhancing the quality of the images generated through global, local, and identity transformation. As a result, the Fixed-Point GAN as introduced and described herein, improves many applications dependant on image-to-image translation, including those in the field of medical image processing for the purposes of disease detection and localization.

The present state of the art may therefore benefit from the systems, methods, and apparatuses for implementing fixed-point image-to-image translation using improved Generative Adversarial Networks (GANs), as is described herein.

BRIEF DESCRIPTION OF THE DRAWINGS

Embodiments are illustrated by way of example, and not by way of limitation, and can be more fully understood with reference to the following detailed description when considered in connection with the figures in which:

FIG. 3D depicts Table 1 showing the loss functions of the Fixed-Point GAN, in accordance with disclosed embodiments;

FIG. 4B depicts Table 2 showing the quantitative comparison of StarGAN and Fixed-Point GAN for the task of cross-domain translation, according to a particular embodiment;

FIG. 5B depicts Table 3 showing the results of the Ablation study of Fixed-Point GAN based data augmentation for improving semantic segmentation of out-of-distribution data, according to a particular embodiment;

FIG. 7D depicts Table 4 showing the results of the ablation study of the generator's configuration on brain lesion (BRATS 2013) and pulmonary embolism (PE) detection;

FIG. 7E depicts Table 5 showing the Hyper-parameters used in the above described experiments;

FIG. 12 illustrates a diagrammatic representation of a machine in the exemplary form of a computer system, in accordance with one embodiment.

DETAILED DESCRIPTION

Figure 1:
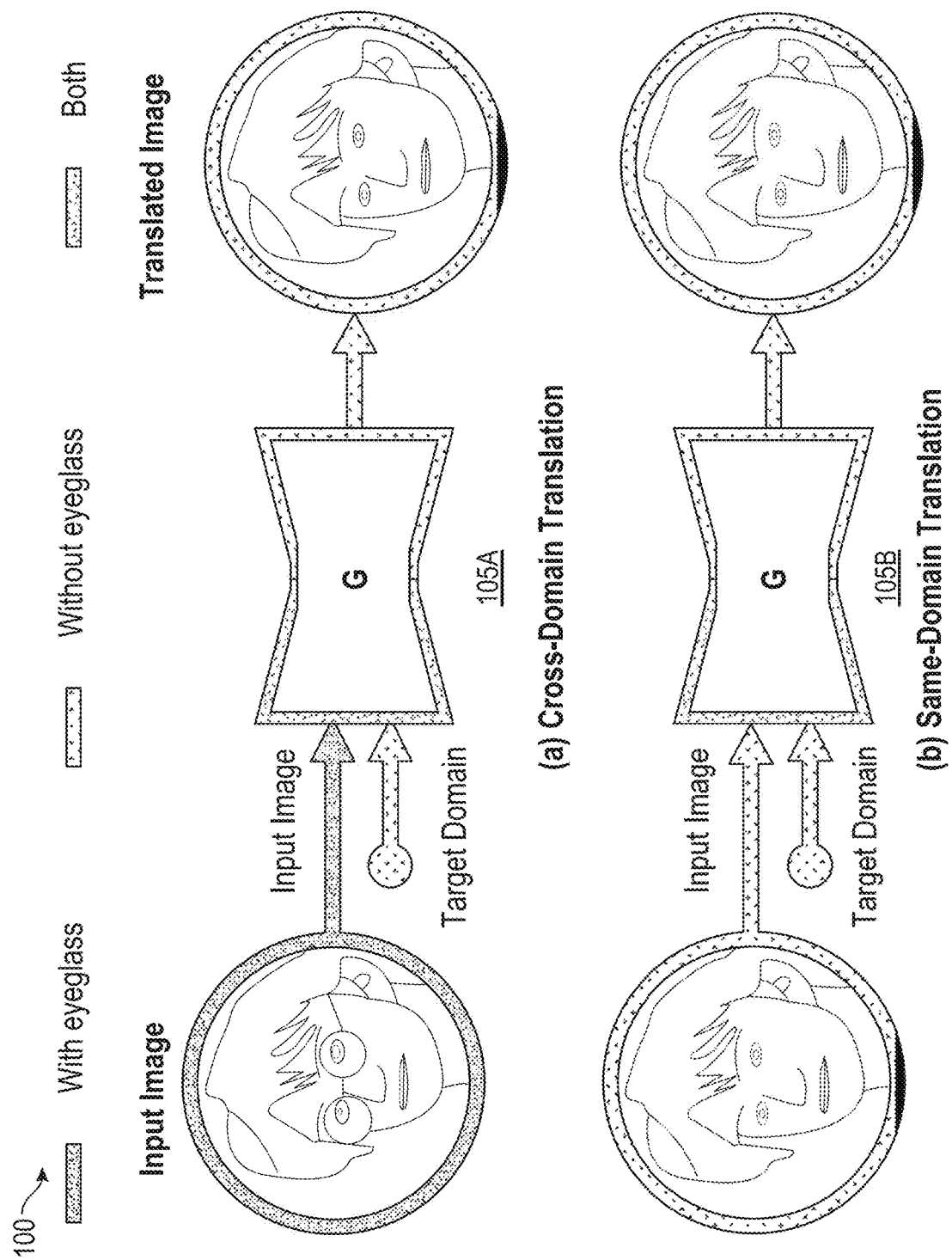
FIG. 1 depicts fixed-point translation as implemented by the Fixed-Point GAN, in accordance with disclosed embodiments.

Described herein are systems, methods, and apparatuses for implementing fixed-point image-to-image translation using improved Generative Adversarial Networks (GANs), in which trained models are then utilized in the context of various applications, including the processing of medical imaging.

The advent of Generative Adversarial Networks (GANs) have ushered in a revolution in image-to-image translation. Interestingly, with the continued development and proliferation of GANs, a unique and yet to be solved problem has presented itself. Specifically, can a GAN be trained to remove an object from an image, when present, while otherwise preserving the image content? And if so, could medical image processing applications be improved through a multi-step operation in which a trained GAN type machine learning model first "virtually heals" a patient by turning that patient's medical image, with an unknown health status (e.g., either diseased or healthy), into a healthy medical image, such that diseased regions of that patient's medical image (if present) may then be revealed through subsequent processing which subtracts the two images, thus revealing any diseased region as the difference between a machine generated "healthy" image and the actual and unmodified image with potentially diseased regions.

Described embodiments provide such capabilities through the use of a new framework, called a Fixed-Point GAN, which outperforms prior-known image-to-image translation methodologies by enhancing the quality of the images generated through global, local, and identity transformation.

As described herein, the above task first utilizes a trained GAN type model to identify a minimal subset of target pixels for domain translation, an ability referred to herein as fixed-point translation, providing functionality above and beyond that which is provided by any previously known GAN.

The new GAN, having such improvements, is therefore referred to as a Fixed-Point GAN, specifically trained by (1) supervising same-domain translation through a conditional identity loss, and (2) regularizing cross-domain translation through revised adversarial, domain classification, and cycle consistency loss.

Through extensive experiments both qualitatively and quantitatively comparing a variety of GAN-based methods, it is demonstrated that the Fixed-Point GAN described herein is not only powerful for the task of disease detection and localization solely by image-level annotation, but also effective for the task of multi-domain image-to-image translation and out-of-distribution image segmentation, with such performance being attributable to the novel capability of fixed-point translation utilizing the Fixed-Point GAN as newly introduced and described in greater detail below.

While Generative Adversarial Networks (GANs) have proven to be successful for image-to-image translation, such as changing the hair color, facial expression, and makeup of a person, previously known methodologies lack the ability to remove an object from an input image while maintaining sufficient quality of those input images having the object removed and importantly, by leaving unchanged those input images for which there was no object to be removed. For instance, previously known GANs lack the ability to remove, for example, eyeglasses from any image of a face with eyeglasses while keeping unchanged those without eyeglasses?

Described embodiments therefore improve upon previously known GANs so as to provide this object removal capability via image-to-image translation and make it adaptable for various applications, including for the processing of medical imaging.

As set forth below, described embodiments provide such improvements by designing a modified GAN to satisfy five stringent requirements: (1) handling unpaired images; (2) translating any image to a target domain requiring no source domain; (3) performing an identity transformation during same-domain translation; (4) performing minimal image transformation for cross-domain translation; and (5) scaling efficiently to multi-domain translation.

Conventional GANs which provide image-to-image translation, although successful, specifically require paired images. Certain variants, such as CycleGAN, mitigate this limitation through cycle consistency, but even CycleGAN still requires two dedicated generators for each pair of image domains, which thus results in a scalability issue. Further still, prior known solutions, such as CycleGAN, are unable to perform image translation without knowing the source domain, in which selecting the suitable generator requires labels for both the source and target domains. Other solutions, such as StarGAN attempts to address these problems by learning using a single generator, however, StarGAN tends to make artifacts or unnecessary changes during translation, even when the target domain is the same as the source domain, as is discussed in greater detail below.

In the context of medical imaging, these unnecessarily changed image regions can be misinterpreted as lesions or abnormal findings by medical imaging applications leading to dire consequences for the patient.

FIG. 1 depicts fixed-point translation as implemented by the Fixed-Point Generative Adversarial Network ("Fixed-Point GAN"), in accordance with disclosed embodiments.

As shown here, the Fixed-Point GAN defines the fixed points of an image as the pixels that are unnecessary to change for conformity to the desired target domain. Fixed-point translation is thus the capability to retain fixed points during domain translation. By learning fixed points, the image translation model learns to transform a minimal set of pixels that are directly related to the target domain, resulting in more appealing images.

As a solution, the Fixed-Point GAN introduces a novel image-to-image translation concept: "fixed-point translation," as is depicted at FIG. 1. Mathematically, x is a fixed point of function $f(\bullet)$ if $f(x)=x$. The Fixed-Point GAN borrows the term to describe the pixels which are to be preserved when applying the GAN translation function. Moreover, the function allows a GAN to identify a minimal subset of pixels for cross-domain translation while keeping the images intact during same-domain translation. To perform fixed-point translation, the Fixed-Point GAN is utilized. A new training scheme is used to promote the fixed-point translation during training (refer to FIGS. 3A to 3C below) by performing the following operations: (1) supervising same-domain translation through an additional conditional identity loss (see e.g., FIGS. 3A to 3C), and further by (2) regularizing cross-domain translation through revised adversarial (see FIG. 3C, at operation F), domain classification (FIG. 3C, at operation F), and cycle consistency (FIG. 3C, at operation H) loss.

With reference again to FIG. 1, let G denote a generator network, which is tasked to remove eyeglasses from a given input image. The cross-domain translation at element 105A is trained to respect fixed points, and G alters only the pixels related to the eyeglasses, treating the rest of the pixels as fixed points. For the same-domain translation at element 105B, the same GAN is supplied with an image with no eyeglasses, in which case all pixels within the image are treated as fixed points. As a result, G generates an output image identical to the input image. Generation of the identical image thus prevents the introduction of unwanted artifacts into the translated image in comparison with previously known techniques that fail to perform fixed-point translation, and thus introduce artifacts into the translated images (refer to FIG. 4A below for examples).

Figure 2:
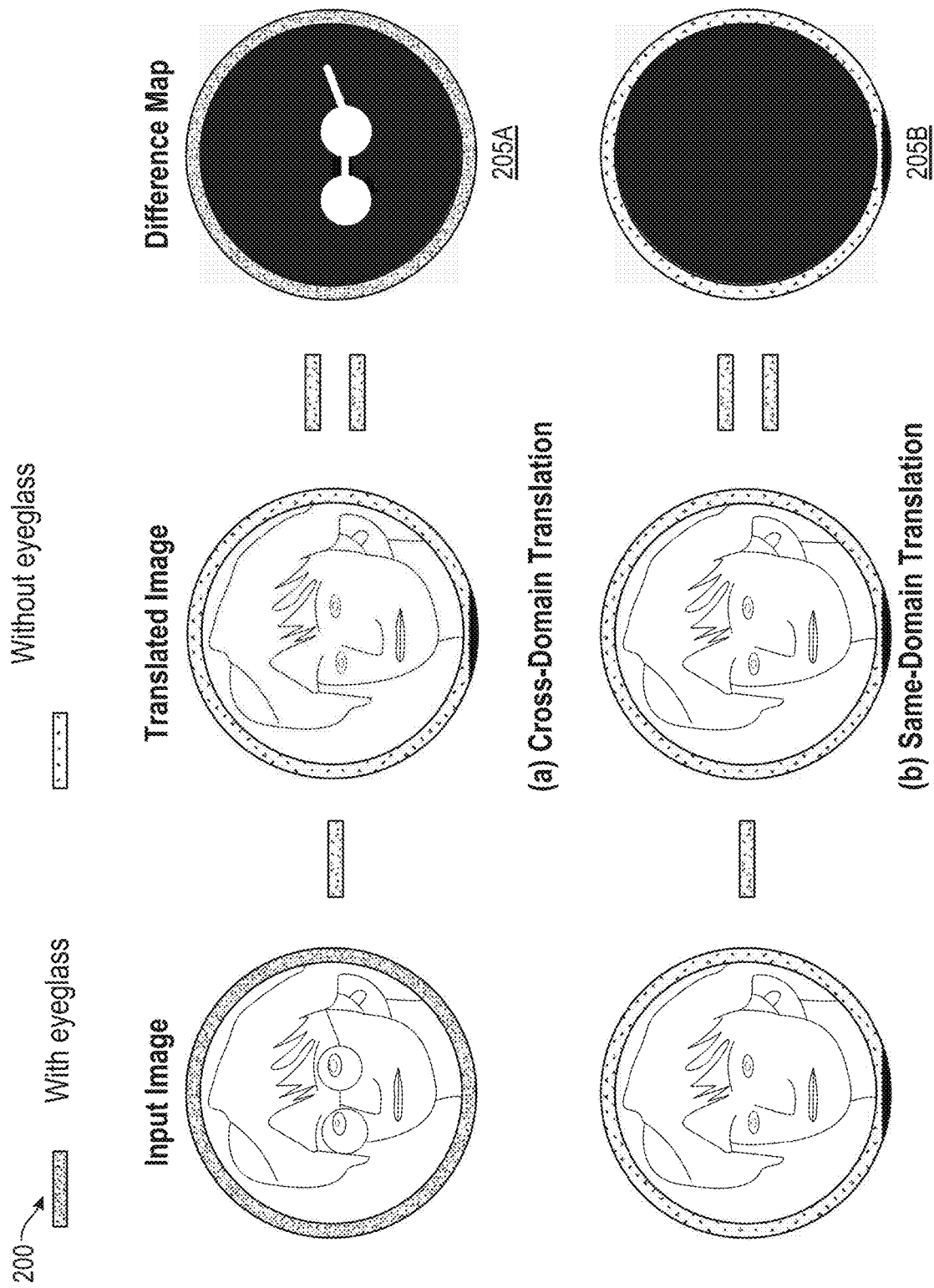
FIG. 2 depicts an exemplary eyeglass detection and localization method using fixed-point translation, in accordance with disclosed embodiments.

FIG. 2 depicts an exemplary eyeglass detection and localization method using fixed-point translation, in accordance with disclosed embodiments.

Further to the discussion above, once the Fixed-Point GAN achieves fixed-point translation, as shown in FIG. 1, the Fixed-Point GAN can subtract the translated output image from the input image to generate a difference map. The difference map from the cross-domain translation at element 205A activates the eyeglasses region since the input image has the object in question, such as the eyeglasses, whereas the translated image is lacking the object in question, which in this case is the missing eyeglasses. In contrast, the difference map from the same domain translation at element 205B is empty as the object in question, the eyeglasses in this example, is entirely absent within the input image. By comparing the maximum activation of these difference maps, the Fixed-Point GAN determines, detects, and identifies, the presence or absence of eyeglasses in the input image, or any other object which is configured to be detected. Once detected, the difference map can further reveal the location of the eyeglasses. This same approach and methodology is therefore extended to disease detection and localization in accordance with described embodiments. Consider, by way of example, the object in question being a diseased region, rather than the eyeglasses. Thus, stated differently, the eyeglasses are a stand-in for various potentially detectable diseases according to such an example. Since only image-level annotations (with/without eyeglasses or diseased/healthy human organ tissues) are required to train the system, the disclosed methodologies can save tremendous annotation costs for localization.

Owing to its fixed-point translation ability, the Fixed-Point GAN not only achieves better image-to-image translation for natural and medical images but also offers a novel framework for both disease detection and localization requiring image-level annotations only, as depicted at FIG. 2. Experimental results demonstrate that the Fixed-Point GAN significantly outperforms previously known GAN-based methods over multiple datasets for the tasks of image-to-image translation, semantic segmentation for out-of-distribution data, and disease detection and localization.

Thus, the newly introduced Fixed-Point GAN provides at least the following contributions and improvements over prior known methodologies: Firstly, described embodiments introduce a new concept, specifically fixed-point translation, thus leading to an improved GAN, referred to herein as the Fixed-Point GAN. Secondly, described embodiments provide a new scheme to promote fixed-point translation by supervising same-domain translation and regularizing cross-domain translation. Thirdly, described embodiments have been experimentally demonstrated to show that Fixed-Point GAN outperforms the state of the art in multi-domain image-to-image translation for both natural and medical images. Fourthly, described embodiments demonstrate that Fixed-Point GAN improves semantic segmentation for out-of-distribution CT/MR data. And fifthly, described embodiments further apply the Fixed-Point GAN as a novel method for disease detection and localization, solely on image-level annotations with experimental results demonstrating that the described methodologies outperform predominant weakly-supervised localization and anomaly detection methods.

Figure 3A:
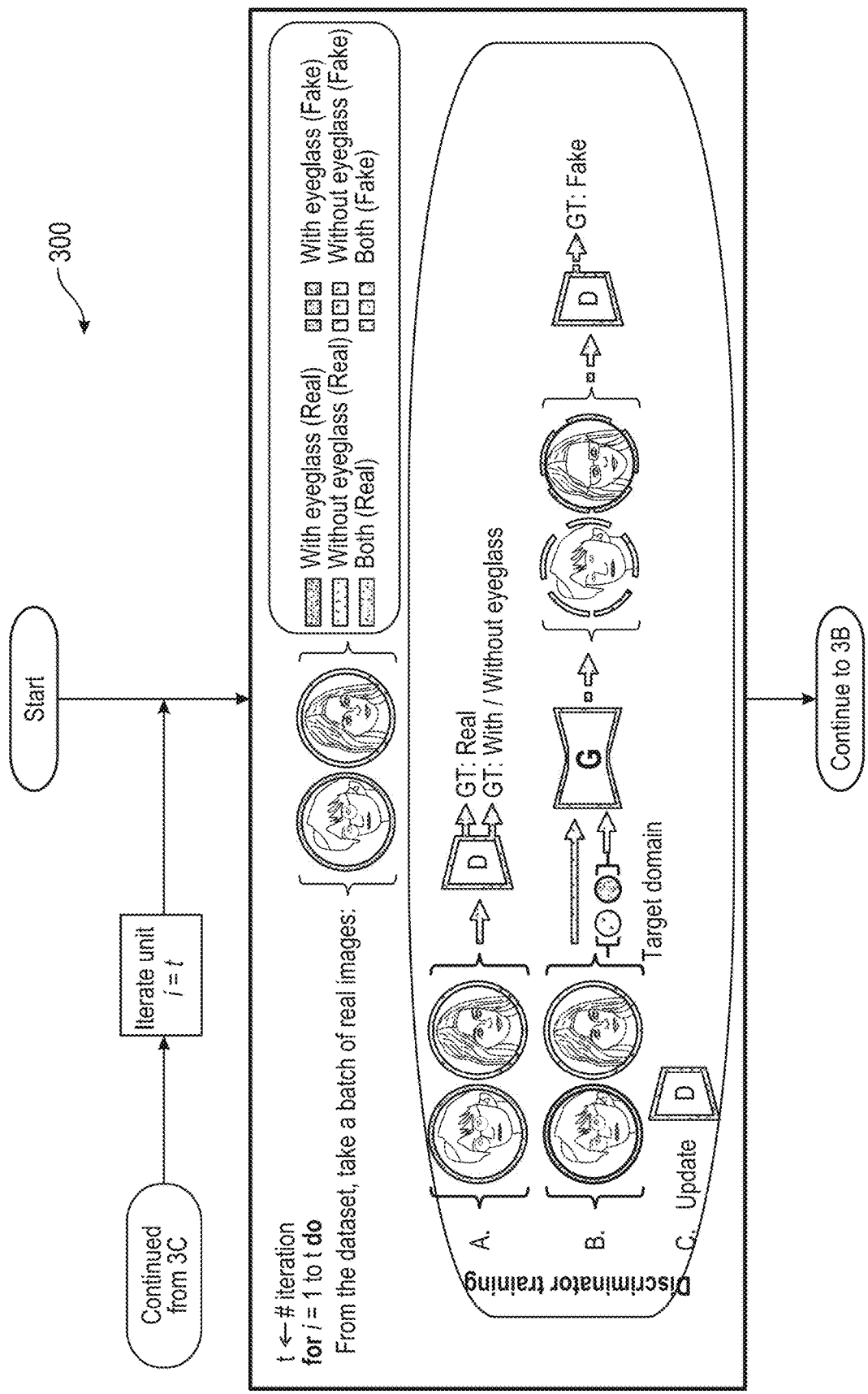
FIGS. 3A, 3B, and 3C summarize the training phase 300 of the Fixed-Point GAN, in accordance with disclosed embodiments.
Figure 3B:
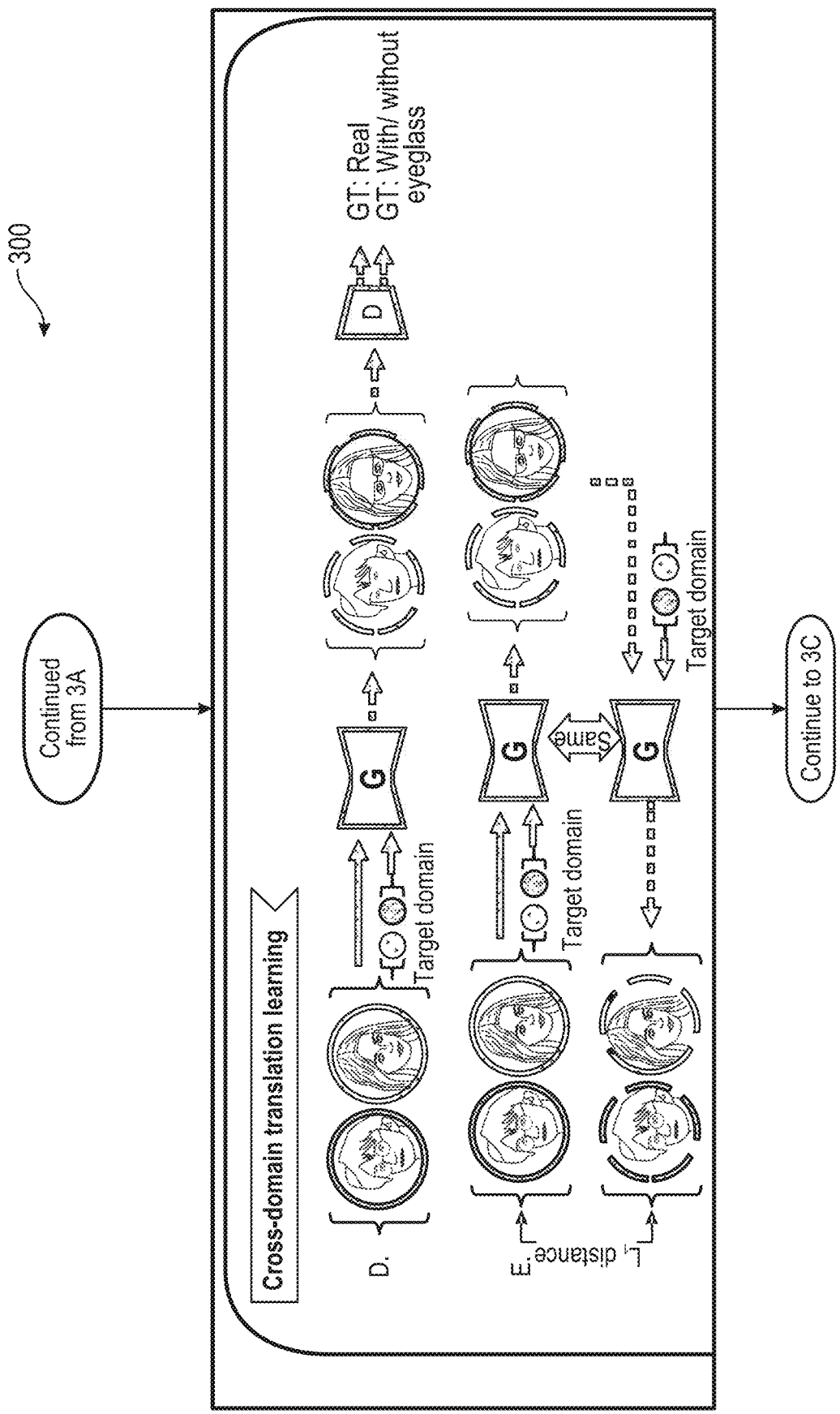
Figure 3C:
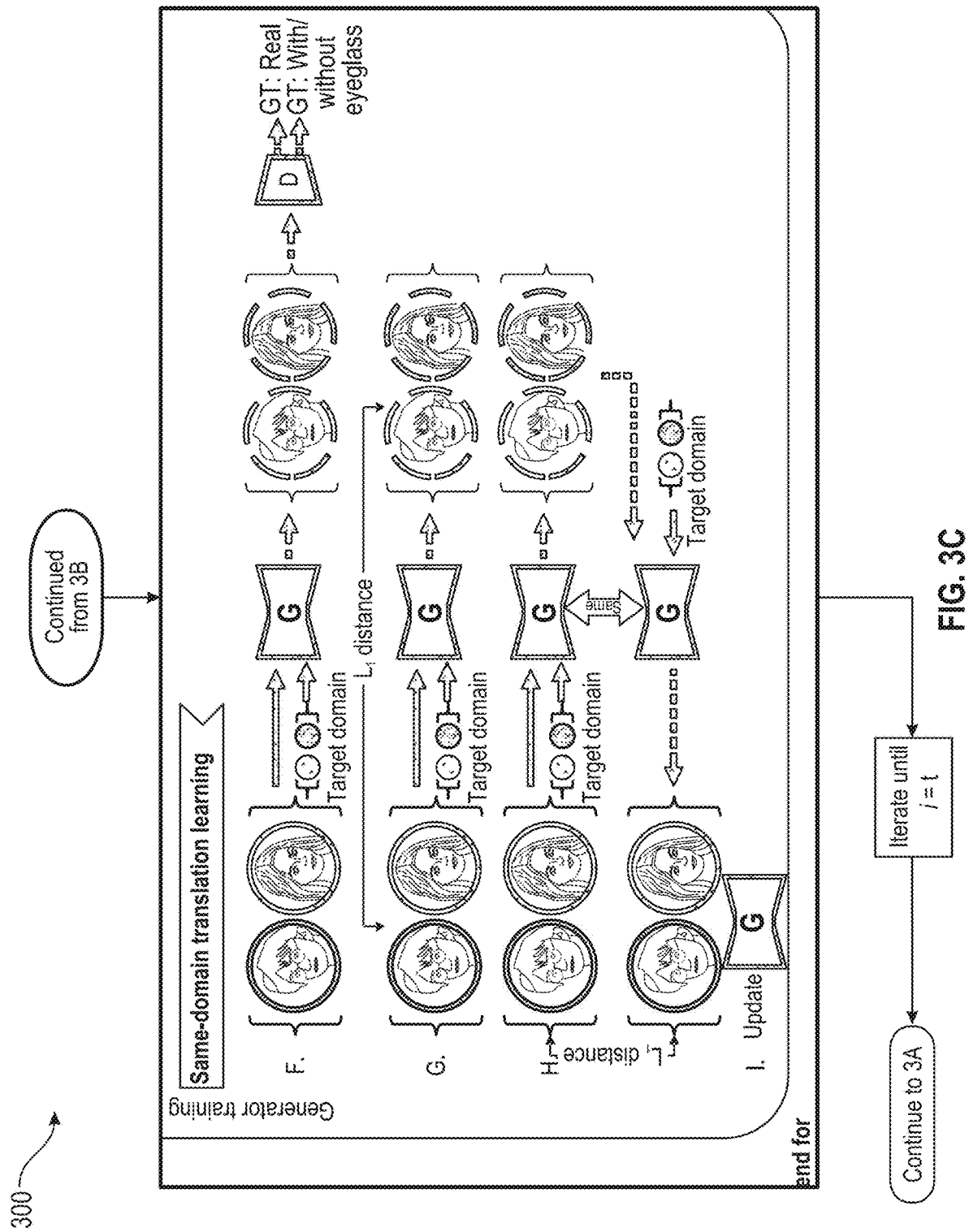

FIGS. 3A, 3B, and 3C summarize the training phase 300 of the Fixed-Point GAN, in accordance with disclosed embodiments.

In particular, the training scheme of the Fixed-Point GAN is depicted. Similar to StarGAN, the discriminator of the Fixed-Point GAN learns to distinguish real/fake images and classify the domains of input images (operations A-B). However, unlike StarGAN, the generator of the Fixed-Point GAN learns to perform not only cross-domain translations (operations D-E) but also same-domain translations (operations F-H) explicitly, which is essential for mitigating the limitations of prior known solutions which result in the introduction of unwanted artifacts (refer to FIG. 4A).

For ease of illustration and without loss of generality, the problem of eyeglasses removal/detection is provided as an example. Thus, given a set of images with and without eyeglasses, the goal is to learn a model that will translate an image with eyeglasses to an image without eyeglasses, and vice-versa. The Fixed-Point GAN described herein uses only one generator network and one discriminator network. The generator network produces the translated images given the input images and the desired target domains, while the discriminator network aims to 1) distinguish between real images and fake (e.g., translated or manipulated) images. The discriminator network further operates to 2) predict the domains of the input images. The training begins with providing the discriminator network a batch of random real images from the dataset as input.

The discriminator is updated to classify the input images as real/fake and their associated domains, {with eyeglasses; without eyeglasses}, as shown by FIG. 3A, operations "A"

through "C". The loss function for real/fake classifier in FIG. 3A, operations "A" and "B" is defined in equation 1, as follows:

Equation 1:

$$\mathcal{L}_{adv}^{D} = \mathbb{E}_{x,c}[D_{real/fake}(G(x,c))] \mathbb{E}_x[D_{real/fake}(x)] \qquad (1)$$

where D is the discriminator network, x is its input, and c is a random target domain. The domain classification loss, FIG. 3A, operation "B", is further governed by equation 2:

Equation 2:

$$\mathcal{L}_{domain}^{D} = \mathbb{E}_{x,c_x}[-\log D_{domain}(c_x|x)] \qquad (2)$$

where c, denotes the image domain. The discriminator is updated to minimize the adversarial and domain classification losses, as shown in FIG. 3A, operation "C."

Training the generator of Fixed-Point GAN can be divided into learning two functionalities: (1) cross-domain translation learning, where the generator learns to change input pixels to match the distribution of the target domain, e.g. adding/removing eyeglasses and (2) same-domain translation learning, where the generator learns to keep the input image fixed (the input and target domains are the same). The second functionality further regularizes the cross-domain translation, keeping pixels unrelated to domain translation fixed. In both cases, the generator learns to translate input images to the target domain in such a way that the generated images look real to the discriminator (FIG. 3B, operation "D" and FIG. 3C operation "F"), but they differ in that cross-domain translation uses a target domain different than the input domain while same-domain translation uses a target domain identical to the input domain. Mathematically, equation 3 provides:

Equation 3:

$$\mathcal{L}_{adv}^{G} = -\sum_{c \in \{c_x, c_y\}} \mathbb{E}_{x,c}[D_{real/fake}(G(x,c))] \qquad (3)$$

where G denotes the generator. As mentioned earlier, $c_x$ is the domain of input image x, which is utilized for same-domain translation (FIG. 3C operation "F"). In contrast, $c_y$ is a different domain than $c_x$, which is used for cross-domain translation (FIG. 3B, operation "D"). For example, if the input image has eyeglasses, then $c_x$=with eyeglasses and $c_y$=without eyeglasses. In addition to generating real images, the generator is trained to generate images in the correct domain. The loss is defined at equation 4, as follows:

Equation 4:

$$\mathcal{L}_{domain}^{G} = \sum_{c \in \{c_x, c_y\}} \mathbb{E}_{x,c}[-\log D_{domain}(c | G(x,c))] \qquad (4)$$

Because the Fixed-Point GAN is trained using unpaired images, cycle-consistency is further utilized as set forth by Equation 5, so as to ensure that the generated images are close to the input images in both cross-domain (FIG. 3B, operation "E") and same-domain (FIG. 3C operation "H") translation learning.

Equation 5:

$$\mathcal{L}_{cyc} = \mathbb{E}_{x,c_x,c_y}[\|G(G(x,c_y),c_x)-x\|1] + \mathbb{E}_{x,c_x}[\|G(G(x,c_x)-x\|1] \qquad (5)$$

An additional identity constraint is imposed as set forth at Equation 6 for same-domain translation, because the output and input images must be identical. This is achieved by minimizing the $L_1$ distance between the input and output images (FIG. 3B, operation "G").

Since this additional constraint is conditionally imposed only on same-domain translation, it is referred to as conditional identity loss.

Equation 6:

$$\mathcal{L}_{id} = \begin{cases} 0, & c = c_y \\ \mathbb{E}_{x,c}[\|G(x,c) - x\|_1], & c = c_x \end{cases} \qquad (6)$$

Once all the losses are computed for generator training, the weights of the generator network are updated (FIG. 3B, operation "I"). This concludes one training iteration and processing thus returns to FIG. 3A, operation "A."

FIG. 3D depicts Table 1 (element 301) showing the loss functions of the Fixed-Point GAN. Terms inherited from StarGAN are in black, while the terms highlighted in grayscale, including $c_x$ of equations 3, 4, and 5, all of equation 6 to the right of the equal sign, and the trailing term $\lambda_{id}\mathcal{L}$ id if equation 8 represent the improvements and modifications to mitigate the limitations of prior known solutions, such as StarGAN.

Combining all losses, the final full objective function for the discriminator and generator can be described by equations 7 and 8, respectively, set forth as follows:

Equation 7:

$$L_D = L_{adv}^{D} + \lambda_{domain} L_{domain}^{D} \qquad (7)$$

Equation 8:

$$L_G = L_{adv}^{G} + \lambda_{domain} L_{domain}^{G} + \lambda_{cyc} L_{cyc} + \lambda_{id} L_{id} \qquad (8)$$

where $\lambda_{domam}$, $\lambda_{cyc}$, and $\lambda_{id}$ determine the relative importance of the domain classification loss, cycle consistency loss, and conditional identity loss, respectively.

Once trained, the Fixed-Point GAN satisfies all five of the stringent requirements mentioned above, specifically:

Requirement (1) Handling unpaired images: The Fixed-Point GAN can handle unpaired images, which enables a wide range of applications where a perfect pair of photos may not be available. Without this property, one would need to acquire photos of the same person with and without eyeglasses for the task of eyeglasses removal. Alternatively, to detect a disease in a medical scan, one would need to collect healthy and diseased medical scans of the same person, which may not be possible for patients with no prior healthy medical scans.

Requirement (2) Translating any image to a target domain requiring no source domain: The Fixed-Point GAN does not require the source domain label; and thus, it can translate images from an unknown arbitrary source domain to a known desired domain, as shown in FIG. 1. This capability enables Fixed-Point GAN to perform tasks such as object detection and localization where it is priori unknown if the input image contains the desired objects. Without this capability, Fixed-Point GAN would require an additional classifier network to induce the source domain label before applying domain translation.

Requirement (3) Performing an identity transformation during same-domain translation: The Fixed-Point GAN mitigates artifacts and unnecessary changes during same-domain translation. As seen in FIG. 1 at element 105B, when the Fixed-Point GAN is tasked to "remove" eyeglasses from an image without eyeglasses, it leaves the input image intact, injecting neither artifacts nor new information into the image.

Requirement (4) Performing minimal image transformation for cross-domain translation: The Fixed-Point GAN performs a minimal image transformation for cross-domain translation. As seen in FIG. 1 at element 105A, when tasked to "remove" eyeglasses from an image with eyeglasses, the Fixed-Point GAN only modifies the image attributes relevant to the translation task, leaving other facial features unchanged.

Requirement (5) Scaling efficiently to multi-domain translation: The Fixed-Point GAN scales efficiently to multi-domain image-to-image translation since it uses only one generator and one discriminator network for translating images among any number of domains. As a result, the benefits of fixed-point translation can be enjoyed across a wide variety of applications.

Figure 4A:
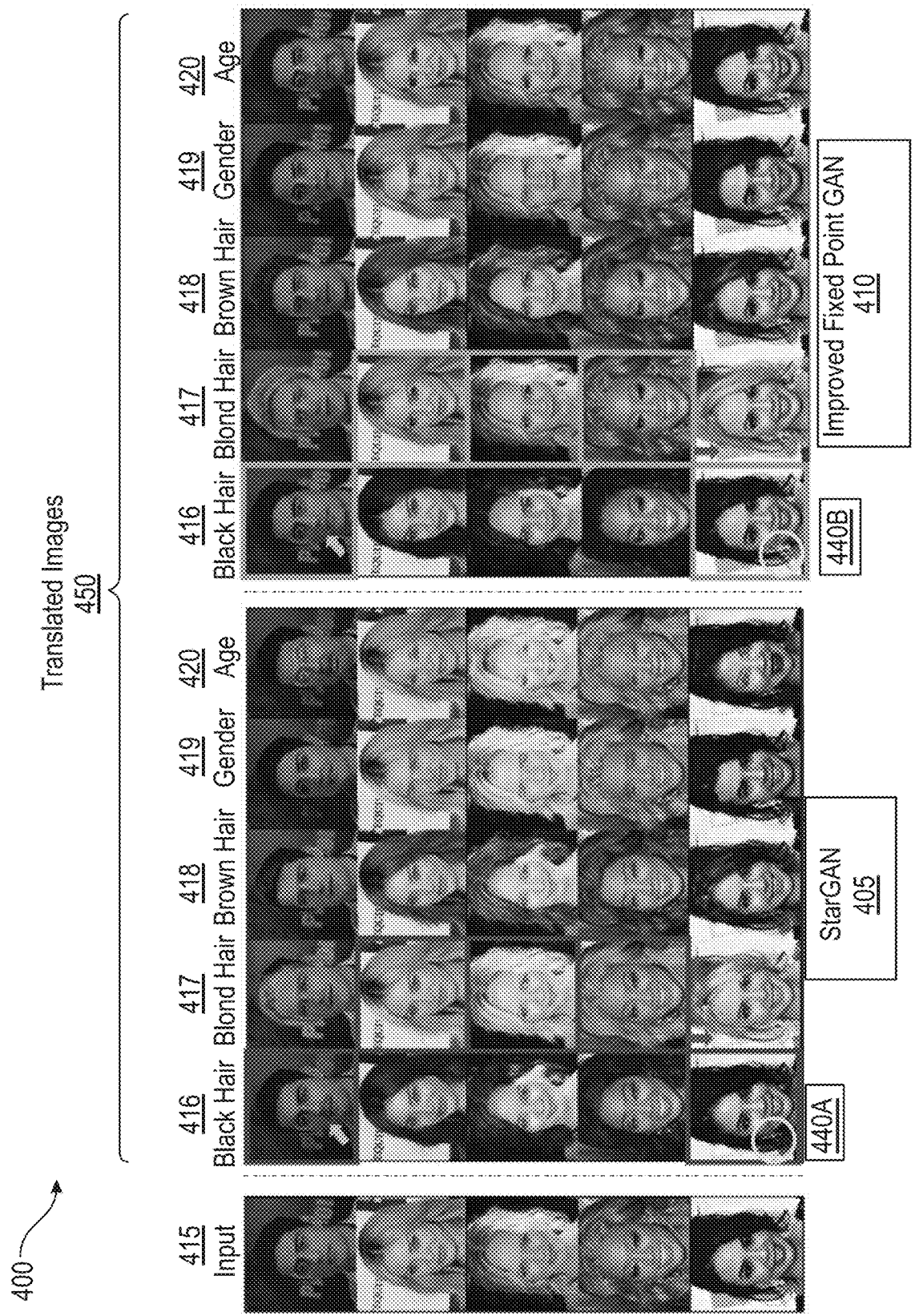
FIG. 4A depicts a comparison of the Fixed-Point GAN with prior known solutions, such as StarGAN, according to a particular embodiment.

FIG. 4A depicts a comparison of the Fixed-Point GAN with prior known solutions, such as StarGAN, according to a particular embodiment.

As depicted here, the provided images provide a comparison of the Fixed-Point GAN 410 described herein with the best known prior solution, StarGAN 405. The comparison translates the five input images 415 into five domains, identified here as black hair 416, blond hair 417, brown hair 418, gender 419, and age 420. Combining the domains may yield a same-domain (e.g., black to black hair) or cross-domain (e.g., black to blond hair) translation. For clarity, same-domain translations are framed in red for StarGAN 405 and in green for Fixed-Point GAN 410.

As illustrated, during cross-domain translations, and especially during same-domain translations, StarGAN 405 generates artifacts including introducing a mustache (Row 1, Col. 2; light blue arrow at element 441A whereas the artifact is not present for the improved Fixed-Point GAN 410 as depicted by element 441B). Similarly, StarGAN 405 generates artifacts such as changing the face colors (Rows 2-5, Cols. 2-6), and introduces artifact such as adding more hair (Row 5, Col. 2; yellow circle as depicted by element 440A whereas the artifact is not present for the improved Fixed-Point GAN 410 as depicted by element 440B). StarGAN 405 generates additional artifacts such as altering the background (Row 5, Col. 3; blue arrow). The Fixed-Point GAN overcomes these drawbacks via fixed-point translation and provides a framework for disease detection and localization with only image-level annotation (see FIG. 6).

Experiments and Results—Fixed-Point Translation Improves Multi-Domain Image-to-Image Translation:

Dataset: To compare the proposed Fixed-Point GAN with StarGAN, the "CelebFaces Attributes" (CelebA) dataset was used. This dataset is composed of a total of 202,599 facial images of various celebrities, each with 40 different attributes. Following StarGAN's public implementation, five domains were adopted (black hair 416, blond hair 417, brown hair 418, male (e.g., gender 419), and young (e.g., age 420) for experiments. The images were preprocessed by cropping the original 178×218 images into 178×178 and then re-scaling to 128×128. A random subset of 2,000 samples was used for testing and the remainder for training.

This dataset helps in evaluating the ability of the Fixed-Point GAN to perform local transformation since image-to-image translation on this dataset requires altering a small portion of the input image while treating the rest as fixed points.

Baselines: StarGAN was used as the baseline to provide multi-domain image-to-image translation.

Evaluation method: Cross-domain image translation was evaluated qualitatively by changing one attribute (e.g. hair color, gender, or age) at a time from the source domain. This step-wise evaluation facilitates tracking changes to image content. Cross-domain image translation was quantitatively evaluated using classification accuracy. In contrast, same-domain image translation was evaluated qualitatively by performing an identity transformation, while for quantitative evaluation, image-level $L_1$ distance was measured between the input 415 and translated images 450.

Results: For the cross-domain image translation, StarGAN tends to make unnecessary changes, such as altering the face color when the goal of translation is to change the gender, age, or hair color (Rows 2-5 in FIG. 4). The Fixed-Point GAN, however, preserves the face color while successfully translating the images to the target domains. Furthermore, the Fixed-Point GAN preserves the image background (marked with a blue arrow in Row 5 of FIG. 4), but StarGAN fails to do so.

FIG. 4B depicts Table 2 (element 401) showing the quantitative comparison of StarGAN and Fixed-Point GAN for the task of cross-domain translation. In doing so, a facial attribute classifier having 94.5% accuracy for real images was utilized. This classification accuracy can be considered as the technical upper bound for generated images. As seen in Table 2, images generated by StarGAN achieve only 90.82% accuracy where Fixed-Point GAN produces more realistic images achieving 92.31% accuracy. Both quantitative (Table 2) and qualitative comparisons (Refer again to the translated images at FIG. 4A, element 450) establish the superiority of the Fixed-Point GAN over StarGAN for the task of cross-domain translation.

For the same-domain image translation, the superiority of Fixed-Point GAN over StarGAN is even more striking. As shown in FIG. 4A, Fixed-Point GAN effectively keeps the image content intact (images outlined in green) while StarGAN undesirably changes the image content (images outlined in red).

For instance, the input image in the fourth row of FIG. 4A is from the domains of blond hair, female, and young. The same domain translation with StarGAN results in an image in which the hair and face colors are significantly altered. Although this color is closer to the average blond hair color in the dataset, it is far from that in the input image. Fixed-Point GAN, with fixed-point translation ability, handles this problem properly.

Table 2 further presents a quantitative comparison between StarGAN and Fixed-Point GAN for the task of same-domain image translation. The image-level $L_1$ distance between the input and generated images was used as the performance metric. To gain additional insights into the comparison, a dedicated auto-encoder model is included that has the same architecture as the generator used in StarGAN and Fixed-Point GAN. As seen, the dedicated auto-encoder has an image-level $L_1$ reconstruction error of 0.11±0.09, which can be regarded as a technical lower bound for the reconstruction error.

Fixed-Point GAN dramatically reduces the reconstruction error of StarGAN from 2.40±1.24 to 0.36±0.35. The quantitative comparisons provided in Table 2 and the qualitative results shown in FIG. 4A establish the superiority of Fixed-Point GAN over StarGAN for the task of same-domain translation as well.

Experiments and Results—Fixed-Point Translation Improves Semantic Segmentation for Out-Of-Distribution Data:

Dataset: For this experiment, the dataset provided by the Multi-Modality Whole Heart Segmentation (MM-WHS) challenge was utilized. The original dataset is split into training (containing 20 CT and 20 MR volumes) and testing (containing 40 CT and 40 MR volumes) data sets. However, segmentation labels only for the training split are publicly available. Hence, for all of the experiments, only images available in the training set were used. Since the data was collected in-vivo clinical environment from multiple centers, it has ranging image qualities, including some being relatively poor.

The CT/CTA cardiac data covers the whole heart from the upper abdominal to the aortic arch. The original slices have been acquired in the axial view having an in-plane resolution of about 0.78×0.78 mm and an average slice thickness of 1.60 mm. In contrast, the MR data has been acquired with approximately 2 mm acquisition resolution in each direction and is reconstructed (re-sampled) into approximately 1 mm. All the images were re-sampled to isotropic volumes for the experiments. All the experiments were done using a 3-fold cross-validation wherein each fold contained 10 CT and 10 MR volumes in the training split, 5 CT and 5 MR volumes in the validation split, and 5 CT and 5 MR volumes in the testing split that have been assigned randomly. The original dataset contains seven labels, of which, only segmenting myocardium was considered for the experiments. Since the Fixed-Point GAN will translate image modalities (CT/MR) on this dataset, it requires changing all the pixels in the input image evaluating the global transformation capability of Fixed-Point GAN. Baselines.

The experiment compared the Fixed-Point GAN with CycleGAN and StarGAN for translating images between CT and MR modalities in this application. Since CycleGAN can be utilized only to translate images containing two domains, comparing it as a baseline provides more insight into the performance of the Fixed-Point GAN as a scalable alternative. Comparing Fixed-Point GAN with StarGAN allowed the study of the effect of fixed-point translation.

Evaluation method: The Sandfort method was utilized to train a myocardium segmentation model from CT images and apply the model to segment myocardium from MR images (out-of-distribution data), and vice versa. Instead of directly using the segmentation model on the out-of-distribution data (no augmentation), the Sandfort method augments the original dataset by generating out-of-distribution data using image-to-image translation and train the segmentation model with the augmented dataset. The generated data help the model generalize and perform improved segmentation on the real out-of-distribution data using techniques such as the Sandfort method.

Experiments compared StarGAN, CycleGAN, and Fixed-Point GAN as the image-to-image translation methods for data augmentation using the Dice score achieved by the segmentation model on out-of-distribution data. In doing so, the segmentation model is first trained with CT images and tested on MR images, then again trained the model with MR images and tested on CT images.

The average of the Dice scores from both scenarios was reported. Averaging the performance from both scenarios helps to compare the GANs by removing any dataset bias to a specific modality. The entire method is summarized below at FIGS. 8A, 8B, 9A, and 9B.

Figure 5A:
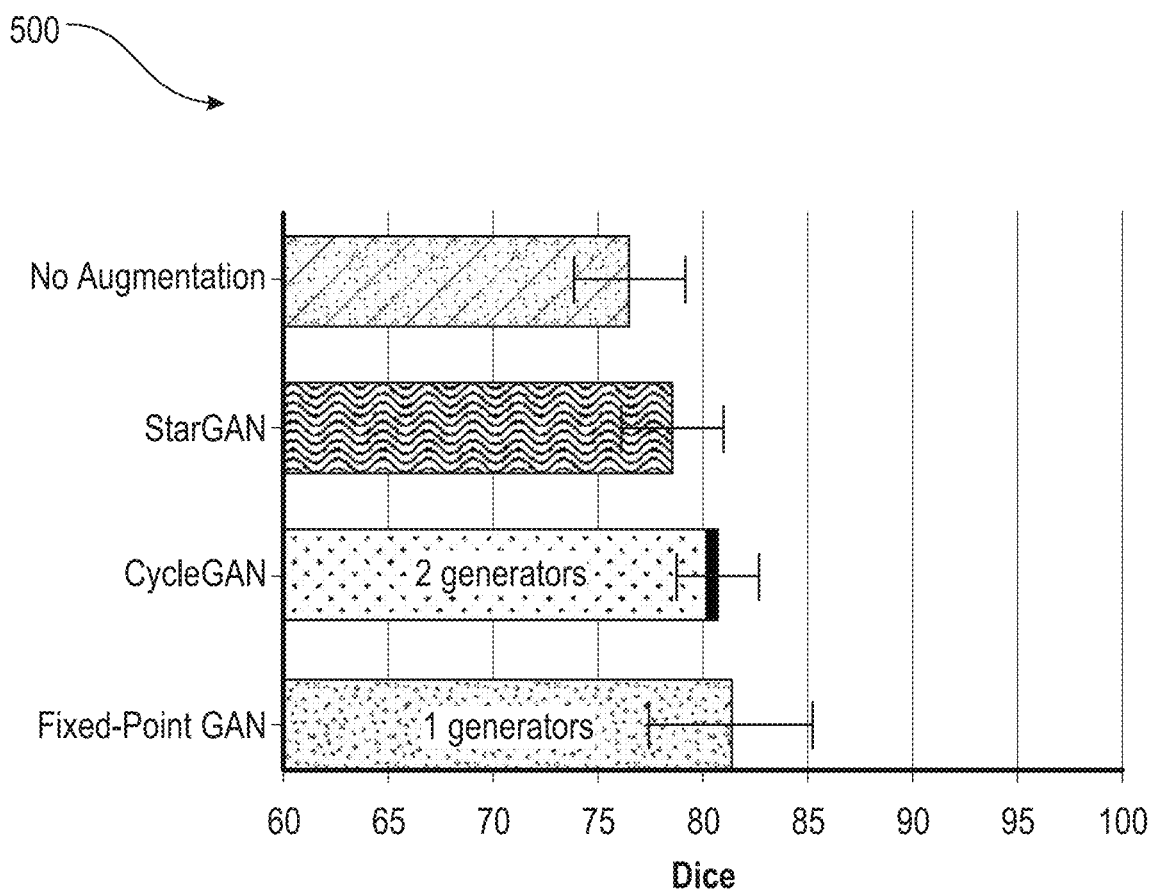
FIG. 5A provides a comparison of the average segmentation performance on out-of-distribution data using StarGAN, CycleGAN, and Fixed-Point GAN for data augmentation, according to a particular embodiment.

FIG. 5A provides a comparison of the average segmentation performance on out-of-distribution data using StarGAN, CycleGAN, and Fixed-Point GAN for data augmentation, according to a particular embodiment.

As shown here, the comparison depicts Dice scores for each of StarGAN, CycleGAN, and Fixed-Point GAN as a data augmentation method for improving segmentation on out-of-distribution data. Fixed-Point GAN owing to patch-level domain classification and fixed-point translation, generates realistic data for augmentation and outperforms both StarGAN and CycleGAN. As Fixed-Point GAN uses only one generator for translating among any number of domains, it is highly scalable compared to CycleGAN.

Results: Without the data augmentation proposed by the Sandfort method, the segmentation models achieve an average Dice score of only 76.56±2.63 on out-of-distribution data. With data augmentation by image-to-image translation methods, the segmentation models consistently perform better segmentation. Data augmented by StarGAN and CycleGAN help the segmentation models achieve Dice scores of 78.60±2.42 and 80.85±1.94, respectively. In contrast, Fixed-Point GAN helps to achieve a Dice score of 81.48±3.91 outperforming both StarGAN and CycleGAN. Note that StarGAN and Fixed-Point GAN utilize only one generator and discriminator network for translating images among n domains. However, CycleGAN requires n×(n−1) generator and n discriminator networks.

As a result, StarGAN and Fixed-Point GAN are scalable to multi-modality translation. For example, translating among T1, T1 contrasted, T2, and FLAIR MRI brain images always require one generator and one discriminator network. In comparison, CycleGAN will require twelve generator and four discriminator networks. In summary, Fixed-Point GAN stands as a scalable image-to-image translation-based data augmentation method for improving segmentation of out-of-distribution data.

Ablation study: To improve the quality of the images generated using global transformation, patch-level domain classification was added in the discriminator of the Fixed-Point GAN. The added patch-level domain classification is used by prior solutions, such as PatchGAN, where it was used to distinguish real/fake patches; however, unlike Patch-GAN, the patch-level loss is used by described embodiments for both real/fake and the domain classification.

This additional regularization enhances the quality of the generated images by ensuring the patches follow the target distribution. Note that this additional loss is not suitable for local transformation because it is priori unknown which specific patches should be subject to regularization.

FIG. 5B depicts Table 3 (element 501) showing the results of the Ablation study of Fixed-Point GAN based data augmentation for improving semantic segmentation of out-of-distribution data. Each component's contribution is shown for two possible training and testing scenarios: (1) trained on MR data but tested on out-of-distribution CT data and (2) trained on CT data but tested on out-of-distribution MRdata. An additional patch-level domain classification was utilized, which improves segmentation of out-of-distribution data. However, the major improvement is contributed by fixed-point translation.

Experiments and Results—Fixed-Point Translation Enables Lesion Detection and Localization with Image-Level Annotation:

Datasets: The described fixed-point translation was utilized to derive a novel weakly supervised lesion detection and localization method, which requires only image-level annotations to train. The BRATS 2013 dataset was used for detecting brain tumors and a private dataset was used for detecting Pulmonary Embolisms or "PE" (a Pulmonary Embolism is a blood clot that travels from a lower extremity source to the lung, where it causes blockage of the pulmonary arteries).

The BRATS 2013 dataset consists of synthetic and real brain MR images, which are both further divided into high-grade gliomas (HG) and low-grade gliomas (LG). There are 25 patients with synthetic HG and LG images and 20 patients with real HG and 10 patients with real LG images. For each patient, FLAIR, T1, T2, and post-Gadolinium T1 magnetic resonance (MR) image sequences are available.

To ease the analysis, the input features were kept consistent by using only one MR imaging sequence (FLAIR) for all patients in both HG and LG categories, resulting in a total of 9,050 synthetic MR slices and 5,633 real MR slices. The dataset was further pre-processed by removing all slices that are either blank or have very little brain information. Finally, 40 patients were randomly selected with 5,827 slices for training and 10 patients with 1,461 slices for testing from synthetic MR images. For the experiments on real MR images, 24 patients were randomly selected with 3,044 slices for training and 6 patients with 418 slices for testing.

During training, one batch of the random samples was set aside from the training dataset for validation. The slices were padded to 300×300 and then center-cropped to 256× 256, ensuring that the brain regions appear in the center of the images. Each pixel in the dataset was then assigned one of the five possible labels: "1" for non-brain, non-tumor, necrosis, cyst, hemorrhage; "2" for surrounding edema; "3" for non-enhancing tumor; "4" for enhancing tumor core; and "0" for everything else. An MR slice was assigned to the healthy domain if all pixels contained in the image are labeled as "0." Otherwise, the MR slice was assigned to the diseased domain. The BRATS 2013 dataset was further utilized to detect and localize the brain lesions rather than segment them.

The Pulmonary Embolisms (PE) database consists of 121 computed tomography pulmonary angiography (CTPA) scans with a total of 326 emboli. A candidate generator was first applied to generate a set of PE candidates, and then by comparing against the ground truth, the PE candidates are labeled as PE or non-PE. Finally, a 2D patch of size 15×15 mm was extracted around each PE candidate according to a vessel-aligned image representation. As a result, PE appears at the center of the images. The extracted images are rescaled to 128×128. The dataset is divided at the patient-level into a training set with 434 PE images (199 unique PEs) and 3,406 non-PE images, and a test set with 253 PE images (127 unique PEs) and 2,162 non-PE images.

The training set is augmented by rotating both PE and non-PE images. To obtain the difference map mentioned above at FIG. 2, disease detection and localization require (1) disease-to-healthy and (2) healthy-to-healthy translations at the testing stage. The former requires GAN to perform local transformation and the latter requires an identical transformation, meaning, the output image is same as the input, similar to the eye-glasses example described above. Therefore, experiments in these datasets evaluate Fixed-Point GAN's ability to perform both local and identical transformations.

Figure 6A:
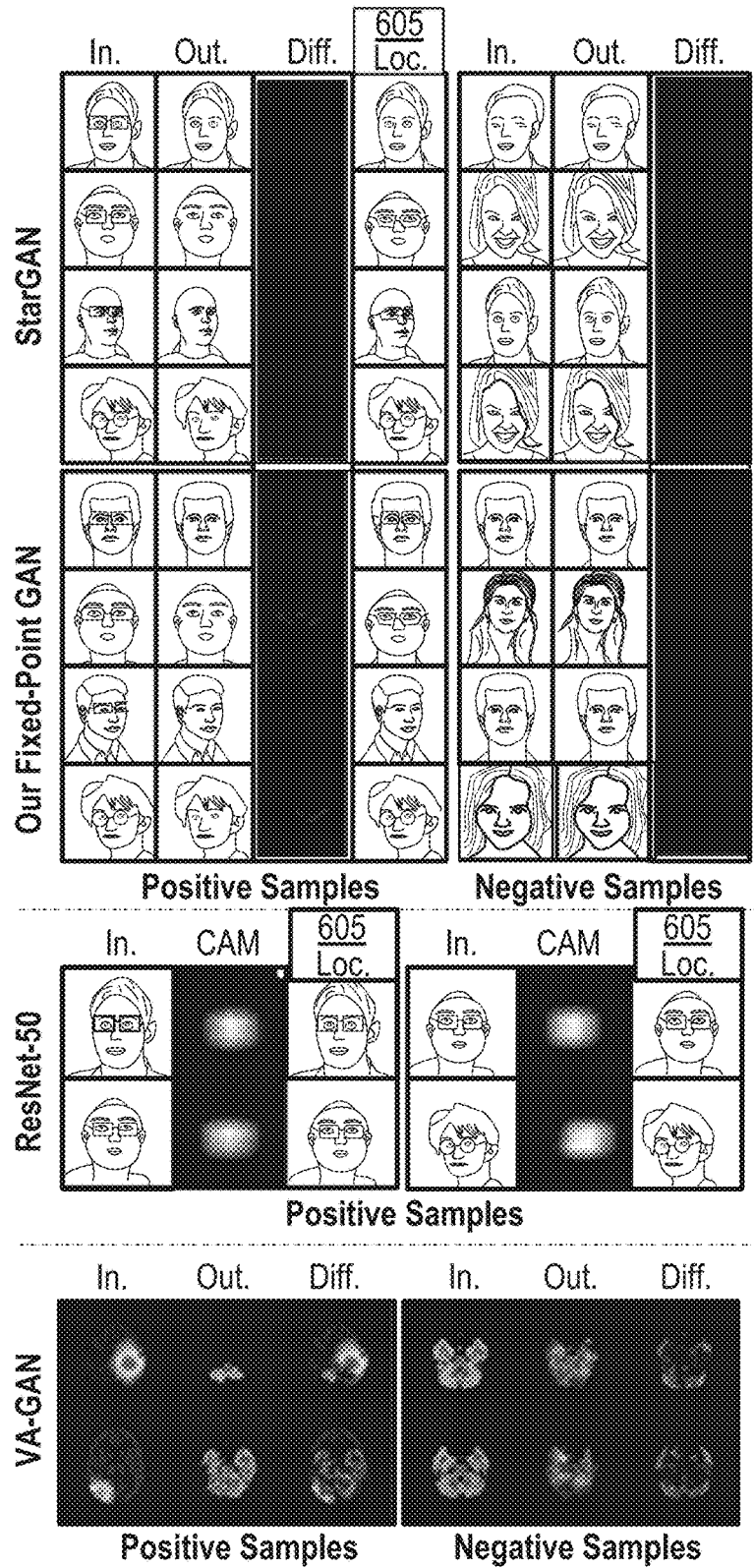
FIGS. 6A, 6B, and 6C provide comparisons of Fixed-Point GAN with the state-of-the-art image-to-image translation, weakly-supervised localization, and anomaly detection for detecting and localizing eyeglasses and diseases using only image-level annotation, according to a particular embodiment.
Figure 6B:
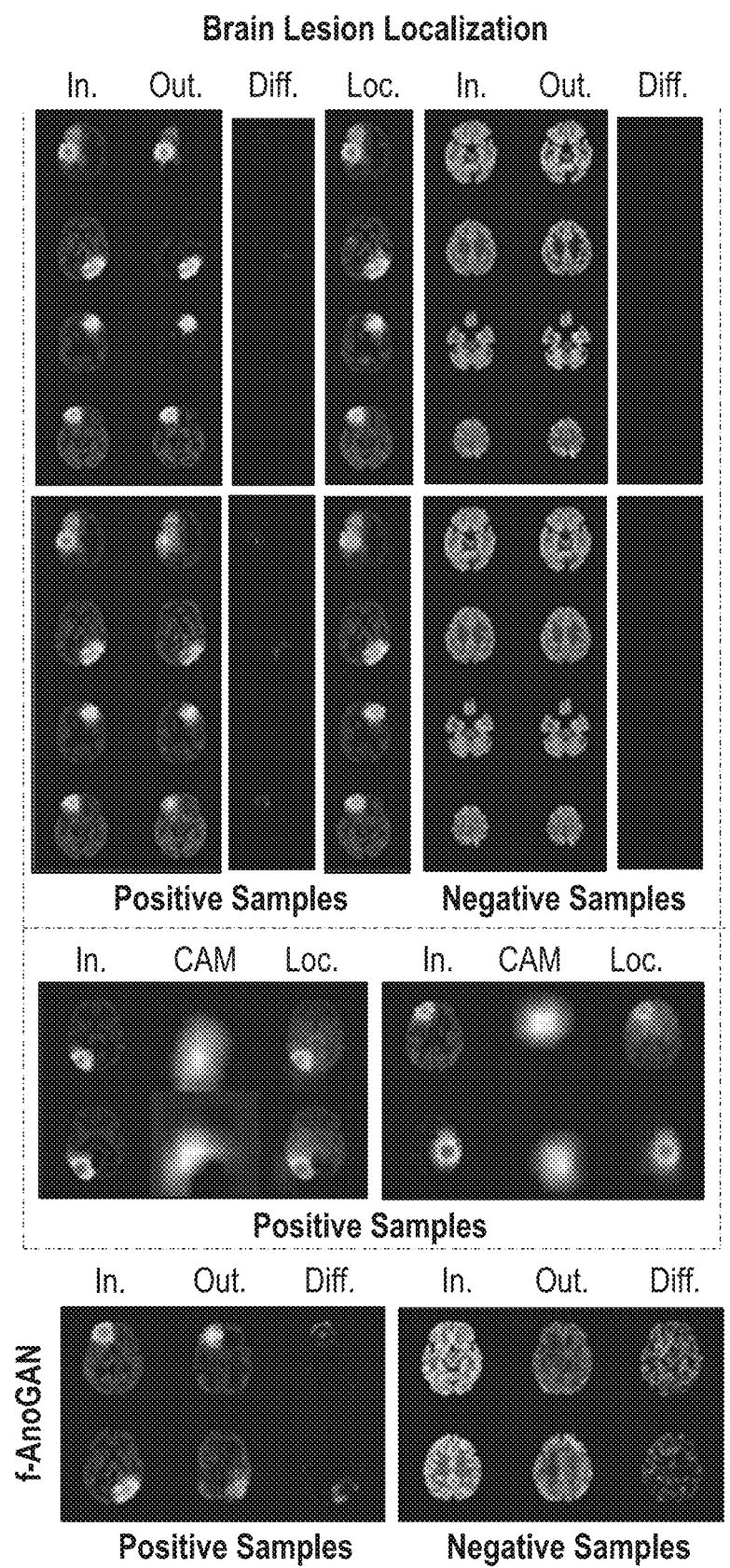
Figure 6C:
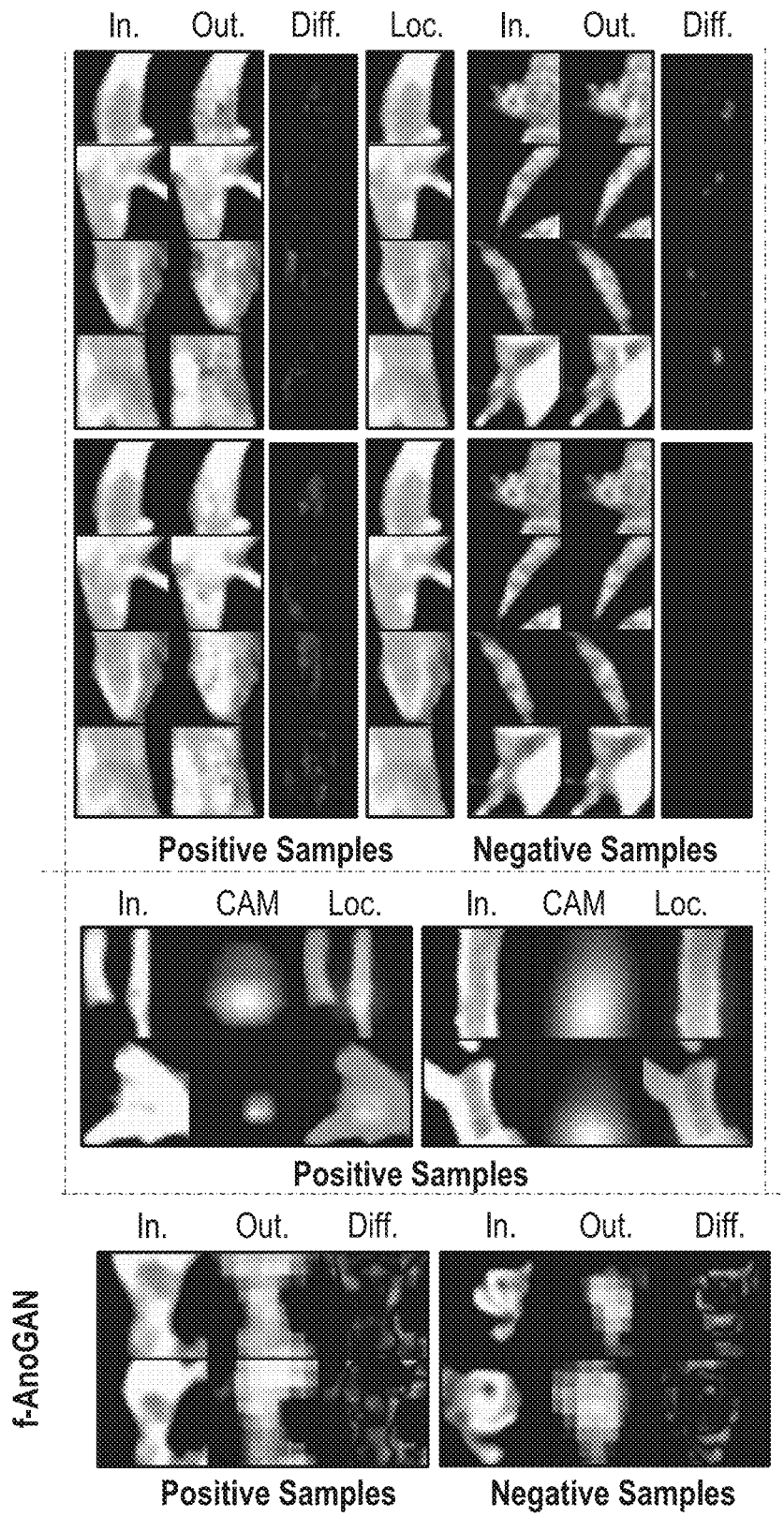

FIGS. 6A, 6B, and 6C provide comparisons of Fixed-Point GAN with the state-of-the-art image-to-image translation, weakly-supervised localization, and anomaly detection for detecting and localizing eyeglasses and diseases using only image-level annotation, according to a particular embodiment.

Using disease detection as an example, the experimental approach was to translate any image, diseased or healthy, into a healthy image, thus allowing diseased regions to be revealed by subtracting those two images. Through fixed-point translation learning, the Fixed-Point GAN preserves healthy images during the translation, thereby few differences between the generated (healthy) images and the original (healthy) images are observed in the difference maps (columns framed in red).

For diseased images, owing to the transformation learning from diseased images to healthy ones, disease locations are revealed in the difference maps (columns framed in yellow). For comparison, the localized diseased regions are superimposed on the original images (Loc. Columns at element 605), showing that Fixed-Point GAN is more precise than prior known methodologies, such as those implemented by CAM, VAGAN, and f-AnoGAN, for localizing eyeglasses and diseases (bottom two rows).

Baselines: For detecting and localizing brain tumors, the Fixed-Point GAN was compared with StarGAN, CAM, f-AnoGAN, and a GAN-based brain lesion detection method depicted at FIG. 8A element 805A (e.g., scenario 1, without GAN).

Comparison with StarGAN reveals the effect of the proposed fixed-point translation learning described herein. For comparison, CAM was selected because it covers an array of weakly-supervised localization works in medical imaging and is arguably a strong performance baseline for comparison. A standard ResNet-50 classifier was trained and ResNet-50-CAM was computed for localization.

Evaluation method: For the GAN based method, difference maps were produced following FIG. 2 above and utilized for both qualitative and quantitative comparisons. The difference maps were compared qualitatively by visualizing them, while for quantitative comparison, the difference maps were used for deriving (1) image-level disease detection and (2) lesion-level localization performance.

For image-level detection, the maximum value across all pixels in the difference map was taken as the detection score. Note that for f-AnoGAN, the average activation of difference maps was used as the detection score because it was more effective than using the maximum activation of difference maps and also more effective than the anomaly scores.

Receiver operating characteristics (ROC) curves were then obtained using the resultant detection scores. For lesion-level localization, free-response receiver operating characteristics (FROC) curves were obtained. To localize the brain lesion, the difference maps were first binarized using color quantization followed by clustering the foreground pixels into the connected components. Each connected component with an area larger than ten pixels is considered as a lesion candidate. A lesion is said to be "detected" if the centroid of at least one lesion candidate falls inside the lesion ground truth. In contrast, a connected component is not pursued for PE localization analysis. Since each PE image has an embolus in its center, an embolus is considered as "detected" if the corresponding PE image is correctly classified; otherwise, the embolus is considered "missed."

Figure 7A:
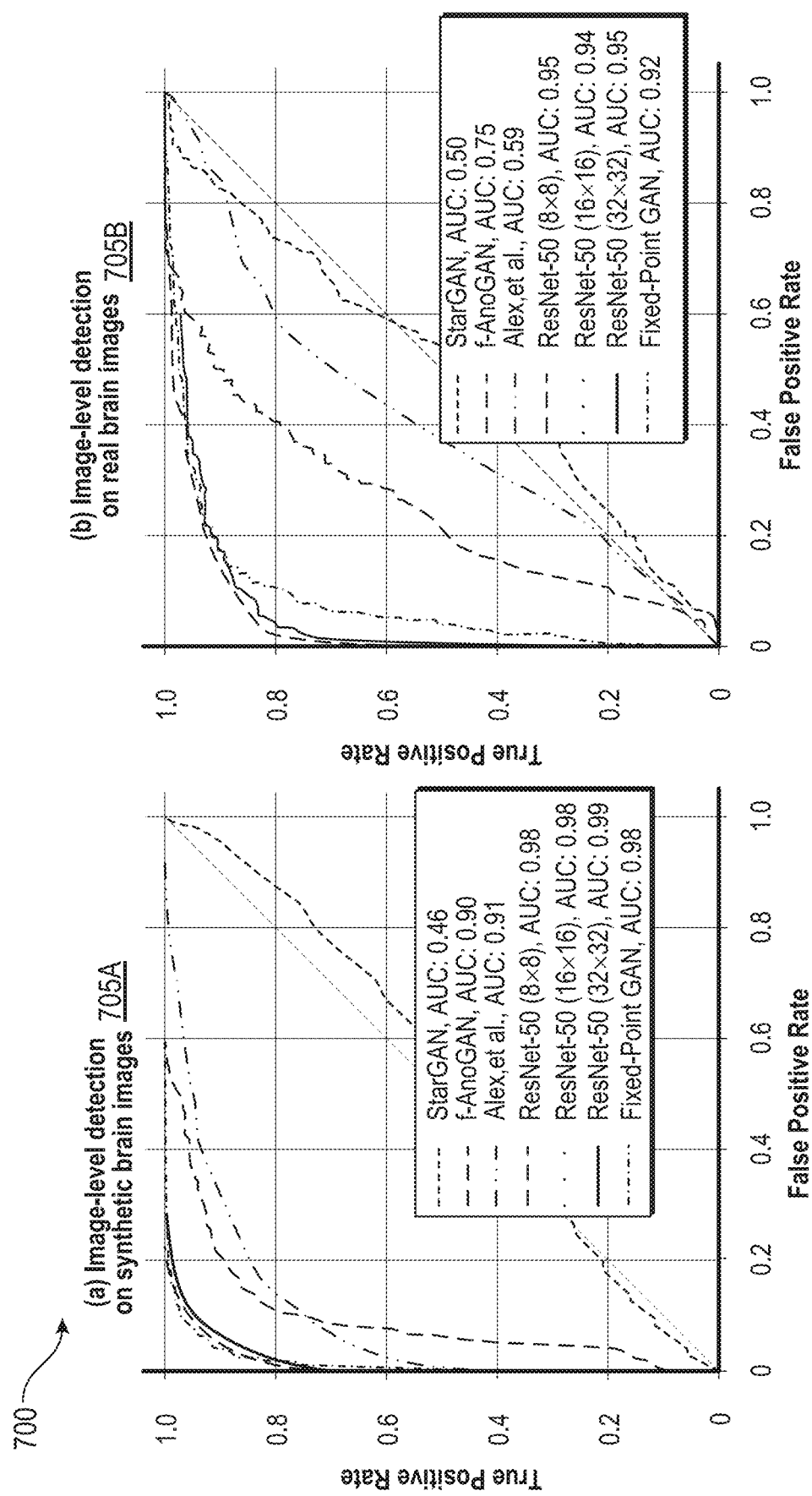
FIGS. 7A, 7B, and 7C provide a summary of the lesion detection (graphs 705A, 705B, and 705C) and localization (705D, 705E, and 705F) results for both BRATS 2013 and PE datasets, according to a particular embodiment.
Figure 7B:
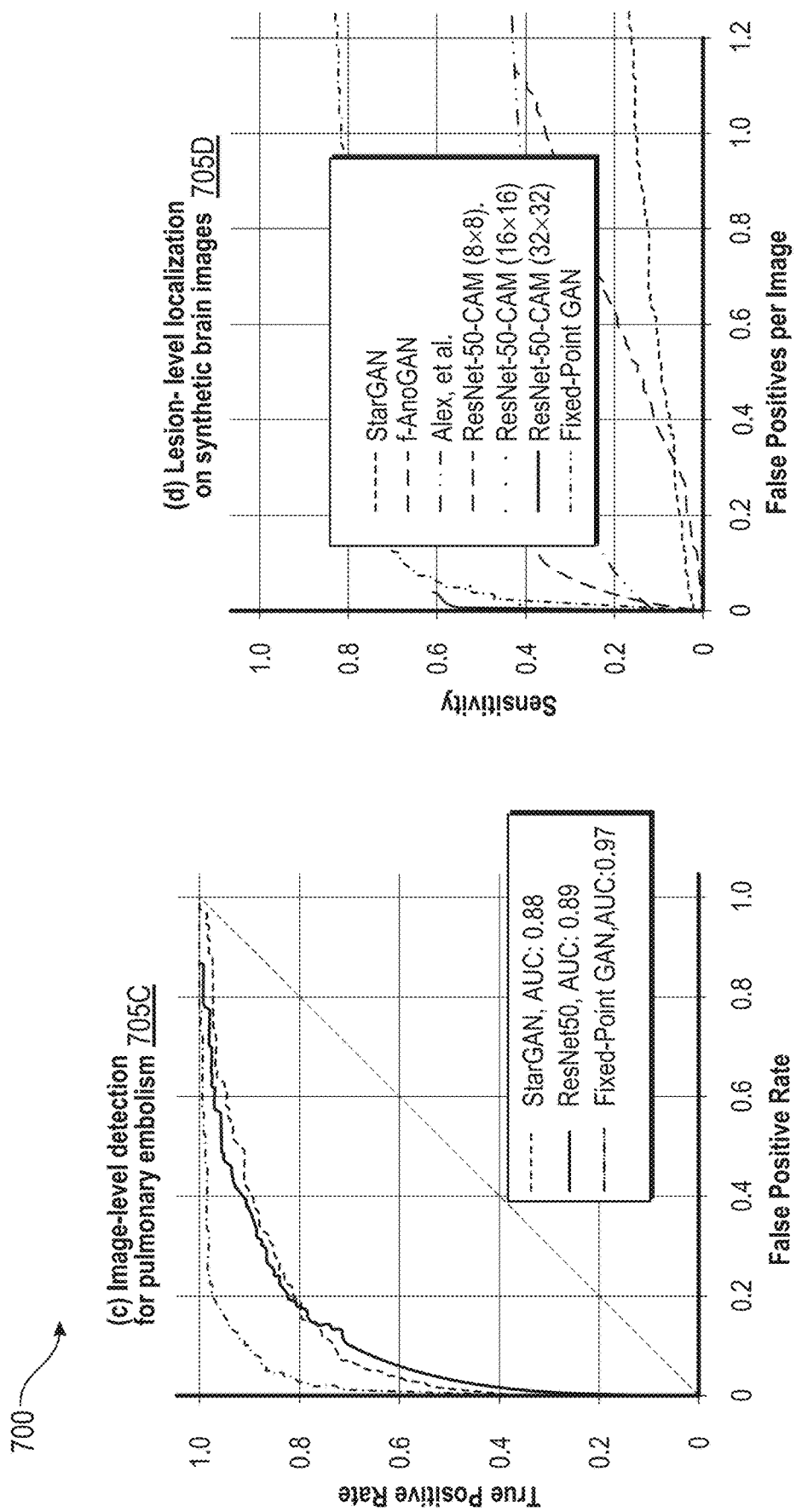
Figure 7C:
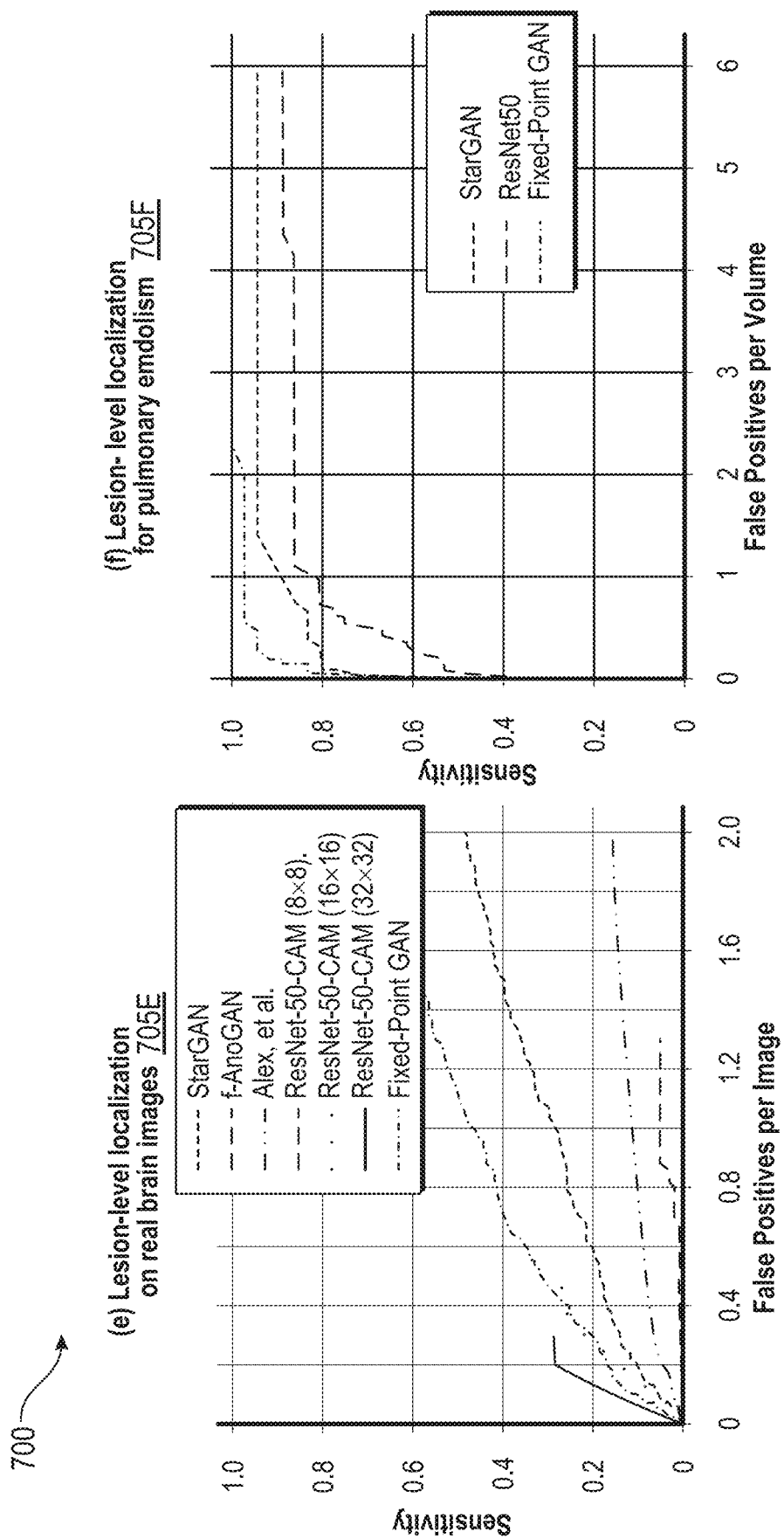

FIGS. 7A, 7B, and 7C provide a summary of the lesion detection (graphs 705A, 705B, and 705C) and localization (705D, 705E, and 705F) results for both BRATS 2013 and PE datasets, according to a particular embodiment.

Comparisons of Fixed-Point GAN with StarGAN, f-AnoGAN, the GAN-based brain lesion detection method by and ResNet-50 are provided by graphs 705A and 705B, using ROCs for image-level detection and in graphs 705D and 705E using FROCs for lesion-level localization on the BRATS 2013 dataset. In contrast, Fixed-Point GANs have been compared with StarGAN, f-AnoGAN, and ResNet-50 in graph 705C using ROCs for image-level PE detection and in graph 705F using FROCs for lesion-level PE localization.

Results for brain lesion detection and localization: As shown at FIG. 7A, graph 705A, a comparison is provided of the ROC curves of Fixed-Point GAN and the competing methods for image-level lesion detection using synthetic MR images.

In terms of the area under the curve (AUC), Fixed-Point GAN achieves comparable performance with the ResNet-50 classifier but substantially outperforms StarGAN, f-AnoGAN, as shown at FIG. 7B, graph 705D shows the FROC analysis for synthetic MR images.

The Fixed-Point GAN achieves a sensitivity of 84.5% at 1 false positive per image, thus outperforming StarGAN, f-AnoGAN, and other prior known methodologies, with the sensitivity levels of 13.6%, 34.6%, and 41.3%, respectively, at the same level of false positives. The ResNet-50-CAM at 32×32 resolution achieves the best sensitivity level of 60% at 0.037 false positives per image. Furthermore, ResNet-50-CAM was compared with the Fixed-Point GAN using mean IoU (intersection over union) score, obtaining a score of 0.2609±0.1283 and 0.3483±0.2420, respectively. Similarly, ROC and FROC analysis on real MR images are provided at FIG. 7A, graph 705B and FIG. 7C, graph 705E, respectively, showing that while the described method is outperformed at the low false-positive range, it nevertheless achieves a significantly higher sensitivity overall. Qualitative comparisons between StarGAN, Fixed-Point GAN, CAM, and f-AnoGAN for brain lesion detection and localization are provided above at FIG. 6.

Results for PE detection and localization: FIG. 7B, graph 705C shows the ROC curves for image-level PE detection. Fixed-Point GAN achieves an AUC of 0.9668 while StarGAN and ResNet-50 achieve AUC scores of only 0.8832 and 0.8879, respectively. FIG. 7C, graph 705F shows FROC curves for PE localization. The Fixed-Point GAN achieves a sensitivity of 97.2% at 1 false positive per volume, outperforming StarGAN and ResNet-50 with sensitivity levels of 88.9% and 80.6%, respectively, at the same level of false positives per volume. The qualitative comparisons for PE removal between StarGAN and Fixed-Point GAN are given above at FIG. 6.

Ablation study: According to one embodiment, the architecture of the generator was slightly changed to predict a residual (delta) map rather than the desired image directly. Specifically, the generator's output is computed by adding the delta map to the input image, followed by the application of a tan h activation function, tan h(G(x, c)+x).

FIG. 7D depicts Table 4 (element 701) showing the results of the ablation study of the generator's configuration on brain lesion (BRATS 2013) and pulmonary embolism (PE) detection. Selected combinations are in bold. The columns "w/Delta", "w/Fixed-Point Translation", and "w/Both" mean StarGAN trained with only delta map, only fixed-point translation learning, and both of them combined, respectively. The empirical results show that the performance gain is largely due to fixed-point translation learning—the contribution by the delta map is minor and application-dependent.

In the ablation study, the major improvement of the Fixed-Point GAN over StarGAN comes from fixed-point translation learning, but the combined approach, for most cases, provides enhanced performance compared to each individual approach. Therefore, the combination of delta map learning and fixed-point translation learning was used by the Fixed-Point GAN for experiments, noting that the major improvement over StarGAN is due to the proposed fixed-point translation learning scheme.

Implementation Details: As seen in Equations 1 and 3, the improved adversarial loss has been utilized, in addition to a gradient penalty loss, which was used to further stabilize the training. The gradient penalty coefficient is set to 10, while values for $\lambda_{domain}$ and $\lambda_{cyc}$, are set to 1 and 10, respectively, for all the experiments, while $\lambda_{id}$ is set to 10 for CelebA, 10 for MM-WHS, 0.1 for BRATS 2013, and 1 for the PE dataset.

From the experiments, 200K iterations were found to be sufficient for CelebA and the PE dataset, whereas BRATS 2013 required 300K iterations for generating good quality images. For the smaller MM-WHS dataset only 20K iterations were used, however, the best model is selected based on validation dataset. To facilitate a fair comparison, the same generator and discriminator architectures as the public implementation of StarGAN were used. All models were trained using the Adam optimizer with a learning rate of $1e^{-4}$ for both the generator and discriminator across all experiments. The generator's parameters were updated once every five updates of discriminator's parameters for all datasets except MM-WHS.

FIG. 7E depicts Table 5 (element 702) showing the Hyper-parameters used in the above described experiments.

Discussion.

Does Fixed-Point GAN guarantee minimal change? For the first time, a fixed-point translation methodology is introduced in the context of medical imaging, a new concept, aiming to conduct an identity transformation for same-domain translation and perform a minimal image transformation for cross-domain translation. The Fixed-Point GAN, achieved by the disclosed training scheme described above (refer to FIG. 3 in the context of Training the Fixed-Point GAN), mimics the fixed-point translation and does not guarantee minimal change. However, the solution described herein is the very first to meet the desired requirements, and the experiments (refer to the experiments and results above) have demonstrated that it has a high precision. Not only does this work solve immediate problems but it will also inspire future researchers to develop even more sophisticated solutions.

Why does StarGAN perform poor brain lesion detection? As shown here at FIG. 7A, graphs 705A and 705B, it is shown that StarGAN performs poorly for image-level brain lesion detection, because Star-GAN is designed to perform general-purpose image translations, rather than an image translation suitable for the task of disease detection. On the other hand, owing to the new training scheme as described herein, Fixed-Point GAN can achieve precise image level detection.

Why does StarGAN detect PE better than brain lesion? Comparing the results as set forth at elements 705A, 705B (refer to FIG. 7A), and 705C (refer to FIG. 7B), it may be observed that StarGAN performs far better for PE than brain lesion detection. This is because brain lesions can appear anywhere in the input images, whereas PE always appears in the center of the input images, resulting in a less challenging problem for StarGAN to solve. Nonetheless, Fixed-Point GAN outperforms StarGAN for PE detection, achieving an AUC score of 0.9668 compared to 0.8832 by StarGAN.

Can Fixed-Point GAN segment a lesion? Referring back to FIG. 6, it may be further observed that neither StarGAN nor Fixed-Point GAN can completely remove large objects, like sunglasses or brain lesions, from the images. Nevertheless, for image-level detection and lesion-level localization, it is sufficient to remove the objects partially, but precise lesion level segmentation using an image-to-image translation network requires complete removal of the object.
Alternative Embodiments.

Fixed-Point GAN can be used for image-to-image translation, improving semantic segmentation for out-of distribution data, as well as disease detection and localization with just image-level annotation. Hence, first compared were the Fixed-Point GAN with other image-to-image translation methods. Then it was shown how Fixed-Point GAN improves semantic segmentation for out-of-distribution data. Finally, the above disclosure explains how Fixed-Point GAN differs from the weakly-supervised lesion localization and anomaly detection methods suggested in medical imaging literature.

Image-to-image translation: Use of GANs for the sake of image-to-image translation is well understood, therefore, the inventors limit discussion to the most relevant alternative embodiments. For instance, use of CycleGAN provides for improvements in unpaired image-to-image translation via cycle consistency. However, CycleGAN requires two generators for translating images between every pair of domains. As a result, during inference, CycleGAN requires that the source domain be provided, thereby violating the requirement #2 as was discussed above. Moreover, CycleGAN fails to meet the scalability requirements (refer to requirement #5) for applications performing a multi-domain translation. Similarly, utilization of two generators is feasible for translating images of human faces between a pair of facial attributes. With such a method, each generator produces the target facial attribute as a residual map, which is imposed on the input image to generate the final translated image. However, like CycleGAN, the approach also violates requirements #2 and 5.

Differently, it is also feasible to utilize an attention-based approach. The method performs image-to-image translation like CycleGAN with additional two networks for generating attention maps. These attention maps are utilized to fuse generated images with the input images and finally produce the translated images. By utilizing attention maps, improved image-to-image translation results when compared to CycleGAN; however, it still violates the requirements #2 and 5 which are enumerated above.

Furthermore, use of SaGAN provides for an attention mechanism for facial attribute editing, however, distinct from other approaches, a generator that takes an input image with the target domain label and translates it to the target domain. An additional network is used to generate an attention mask, which dictates the location of the desired attribute to be modified. This attention mask is utilized to extract the facial attribute from the generated image, which is imposed on the input image to produce the final translated image. Since SaGAN does not require source domain during inference, it satisfies the requirement #2, but still violates the requirement #5, as the attention network cannot produce multiple attention masks for multiple facial attributes. A different ensemble-based method may be utilized as an alternative to cycle consistency for improved unpaired image-to-image translation. However, such a method currently does not offer its benefits to be extended for multi-domain image-to-image translation, thus violating the requirement #5. In contrast, StarGAN resolves the scalability issue by empowering a single generator with the capability for multi-domain image-to-image translation and does not require the source domain of the input image at the time of inference. However, StarGAN has its own shortcomings, which violate requirements #3 and 4 which are enumerated above. The disclosed Fixed-Point GAN methodology overcomes StarGAN's shortcomings, dramatically improving image-to-image translation and opening the door to an innovative use of the generator as a disease detector and localizer. Recent multi-domain image-to-image translation methods recently made available also enforce same-domain translation which is a crucial part for achieving the proposed fixed-point translation techniques as set forth herein. However, the described embodiments notably differ from those recent techniques given that the techniques enforce same-domain translation with additional modification in the network architecture, mostly focusing on the application of facial attribute modification.

n contrast, the disclosed methodology provides comprehensive insights about the disclosed training scheme to achieve fixed-point translation using applications, in both natural and medical imaging, capable of evaluating all three transformations, namely, local, global, and identity transformations. Note that StarGAN v2 is not applicable in the context here given that it focuses on a different goal of generating diverse images with global changes which naturally violates the requirement #5 as enumerated above.

Semantic segmentation of out-of-distribution data: Image-to-image translation based methods for improving semantic segmentation of out-of-distribution data are gaining popularity in both natural and medical imaging lately, where the segmentation knowledge learned in a source domain is applied on a different target domain's data.

For instance, certain approaches have utilized image-to-image translation to learn segmenting in a domain with abundant annotations, such as synthetic data generated using computer graphics, and then transfer the knowledge to a domain with less or no annotations, such as real data. In that same spirit, the developers of the Sandfort method have employed image-to-image translation to generalize the segmentation model trained with contrast CT images to unseen non-contrast CT images and vice-versa. On the other hand, competing techniques propose to translate pelvic CT images to synthetic sMRI images using image-to-image translation. Since synthetic sMRI images contain superior soft-tissue information, segmenting from images translated to sMRI yields better segmentation. However, the effectiveness of these methods is largely dependant on the quality of the images generated from the underlying image-to-image translation methods, which is an equivalent of CycleGAN in most cases.

In the discussion above with respect to "Fixed-Point Translation Improves Semantic Segmentation for Out-Of-Distribution Data," (refer to FIGS. 4A and 4B) it is shown that the Fixed-Point GAN, with its fixed-point translation ability, improves the segmentation of out-of-distribution data by reducing artifacts introduced by current state-of-the-art image-to-image translation methods.

Weakly-supervised localization: The disclosed methodologies are also closely complementary and may be utilized for weakly-supervised localization, which, in natural imaging, is commonly tackled by saliency map, global max pooling, and class activation map (CAM) based on global average pooling (GAP). In particular, the CAM technique has recently been the subject of further research, resulting in several extensions with improved localization power. For instance, certain techniques replace the original GAP with a log-sum-exponential pooling layer, while other techniques aim to force the CAM to discover the complementary parts rather than just the most discriminative parts of the objects. Still further, GradCAM operates such that the weights used to generate the CAM come from gradient back propagation; that is to say, the weights depend on the input image as opposed to the fixed pre-trained weights used in the original CAM.

Despite the extensive literature in natural imaging, weakly supervised localization in medical imaging has taken off only recently. For instance, the CAM technique has been utilized for the first time for lesion localization in chest Xrays. Such research, however, either combined the original CAM with extra information (e.g., limited fine-grained annotation and disease severity-level, or slightly extended the original CAM with no significant localization gain. Notably, the adoption of more advanced versions of the CAM such as the complementary-discovery algorithm has not proved promising for weakly-supervised lesion localization in medical imaging.

Different from the previous works, the VA-GAN method operates to learn the difference between a healthy brain and the one affected by Alzheimer's disease. Although unpaired, VA-GAN requires that all images be registered; otherwise, it fails to preserve the normal brain structures (refer to FIG. 9A). Furthermore, VA-GAN requires the source-domain label at inference time (input image being healthy or diseased), thus violating the requirement #2 as enumerated above. Therefore, the vanilla and unmodified CAM approach remains as a strong performance baseline for weakly-supervised lesion localization in medical imaging.

The novel techniques described herein are the first to utilize GANs based on image-to-image translation for disease detection and localization with just image-level annotation. Both qualitative and quantitative results suggest that the disclosed image-translation-based approach provides more precise localization than the CAM-based method.

Anomaly detection: The described techniques may seem related to anomaly detection where the task is to detect rare diseases by learning from only healthy images, however, the presently described solution is more powerful. For instance, one less preferred technique is to utilize an adversarial autoencoder to learn healthy data distribution. The anomalies are identified by feeding a diseased image to the trained autoencoder followed by subtracting the reconstructed diseased image from the input image. Another less preferred approach is to learn a generative model of healthy training data through a GAN, which receives a random latent vector as input and then attempts to distinguish between real and generated fake healthy images. Both these approaches utilize a fast mapping that can identify anomalies of the diseased images by projecting the diseased data into the GAN's latent space. In so doing, a GAN can to learn a generative model of healthy data. To identify anomalies, the technique then scans an image pixel-by-pixel and feeds the scanned crops to the discriminator of the trained GAN. An anomaly map is then constructed by putting together the anomaly scores given by the discriminator. However, Fixed-Point GAN is different from anomaly detectors in both training and functionality.

More specifically, fixed-Point GAN is trained using both healthy and diseased images whereas anomaly detectors are trained using only the healthy images. Fixed-Point GAN has the potential to predict multiple diseases individually owing to its multi-domain translation ability with one generator, but anomaly detectors are limited to detecting only a single category "anomaly." Nevertheless, for a comprehensive analysis, Fixed-Point GAN are compared against such anomaly detectors.

Therefore, fixed-point translation methodologies upon which Fixed-Point GAN is built is extended by at leas the following improvements: First, a patch-level classification loss in the discriminator is applied for image-to-image translation requiring global changes, utilizing its inherent property, which contributes to the quality of the generated images discussed above. Second, improved semantic segmentation is provided for out-of-distribution CT/MR data (as shown in FIG. 5), by utilizing the quality enhanced images translated through Fixed-Point GAN. Third, a comprehensive ablation study was conducted comparing the effect of the proposed patch-level classification and the fixed-point translation on image-to-image translation requiring global changes in Table 3. Both of which are experimentally proven to be effective for enhancing the quality of the generated images, thus improving the semantic segmentation for out-of-distribution data. Fourth, a detailed methodology description is incorporated to train Fixed-Point GAN as described above. And fifth, notations and formulas are introduced to simplify the learning objectives detailed above (refer to FIGS. 3A through 3D). Moreover, new diagrams are provided with examples to illustrate these novel concepts, such as fixed-point translation as set forth at FIG. 1 and eyeglass/disease detection and localization method using fixed-point translation in FIG. 2.

It is therefore in accordance with the described embodiments that a novel concept called fixed-point translation is presented upon which a newly developed GAN called Fixed-Point GAN is to be utilized to solve the above described problems present within prior known solutions. The comprehensive evaluation demonstrates that the disclosed Fixed-Point GAN outperforms image-to-image translation methods, enhancing the quality of the images generated through global, local, and identity transformation. As a result, Fixed-Point GAN has an intrinsic ability to improve many applications depending on image-to-image translation, for instance, it has been shown to provide improved facial attribute modification and improved semantic segmentation of out-of-distribution data. Moreover, Fixed-Point GAN has unlocked the possibilities of new applications, such as disease detection and localization using just image-level annotations where Fixed-Point GAN is significantly superior to predominant anomaly detection and weakly-supervised localization methods. The superior performance of Fixed-Point GAN is attributed to our new training scheme, realized by supervising same-domain translation and regularizing cross-domain translation.

Figure 8A:
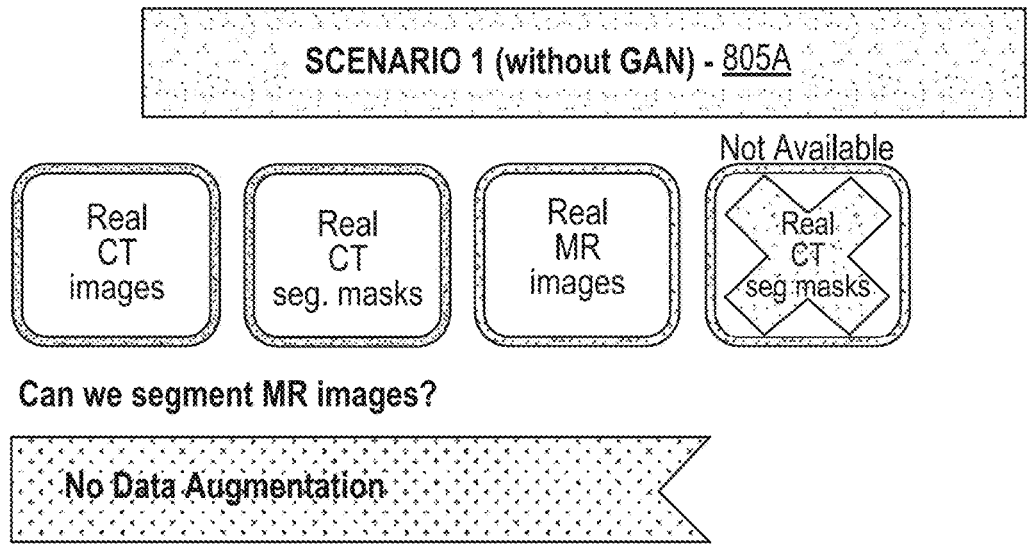
FIGS. 8A and 8B illustrate a proposed scenario 1 processed with and without GAN, respectively, according to a particular embodiment, according to a particular embodiment.
Figure 8A:
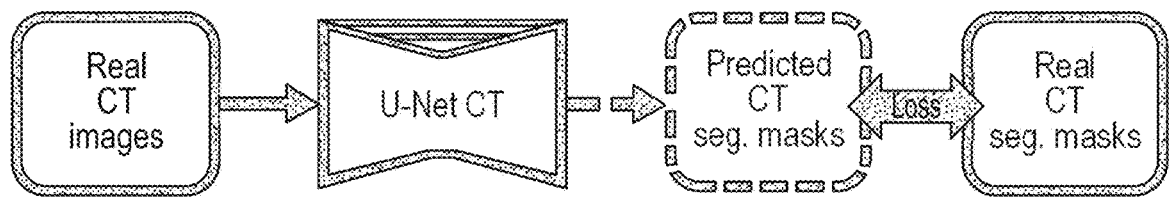
Figure 8A:
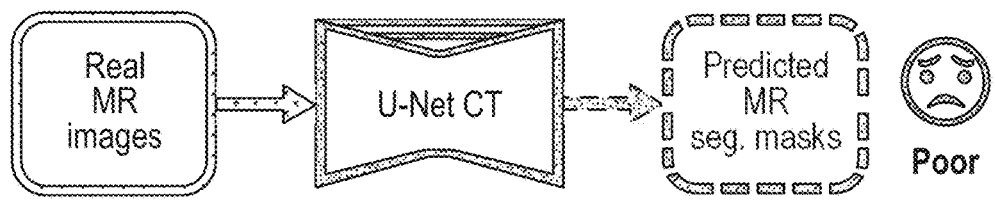
Figure 8B:
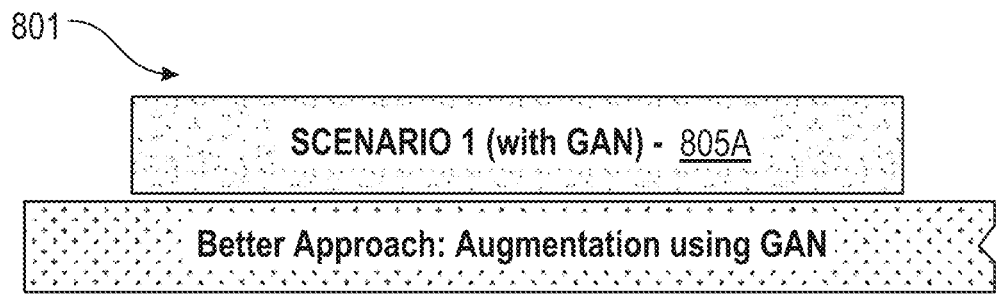
Figure 8B:
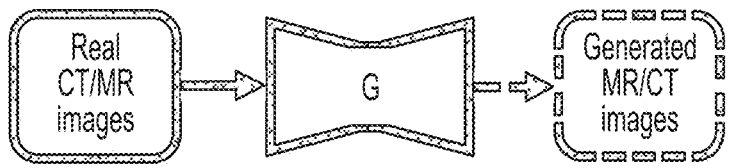
Figure 8B:
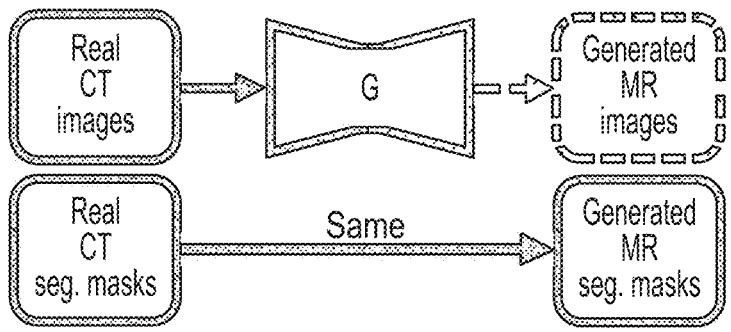
Figure 8B:
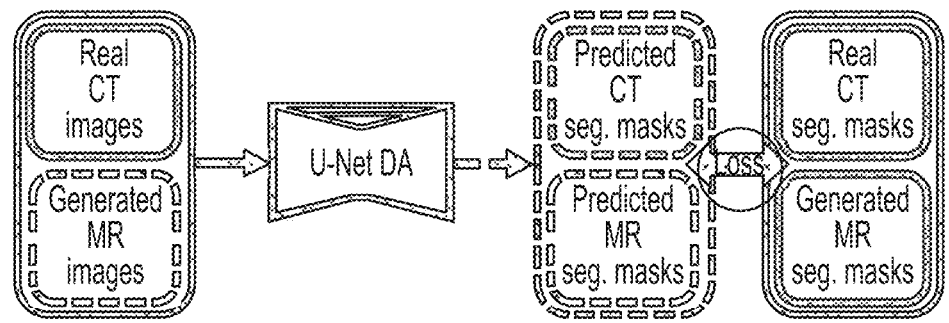
Figure 8B:
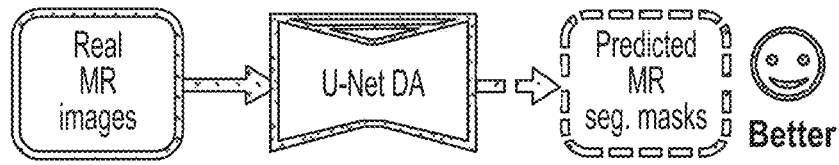

FIGS. 8A and 8B illustrate a proposed scenario 1 processed with and without GAN, respectively, according to a particular embodiment.

As shown here, processing of the MR images at scenario 1 without GAN as depicted by element 805A at FIG. 8A results in a poor segmentation. Conversely, processing of the MR images at scenario 1 with GAN as depicted by element 805B at FIG. 8B provides for a better approach through the use of augmentation using GAN, and thus resulting in a better segmentation result.

Figure 9A:
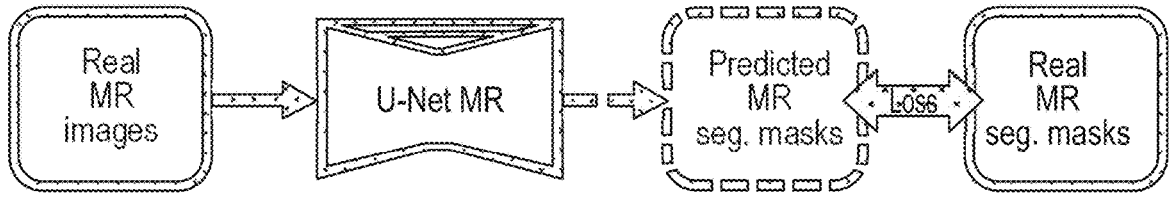
FIGS. 9A and 9B illustrate a proposed scenario 2 processed with and without GAN, respectively, according to a particular embodiment.
Figure 9A:
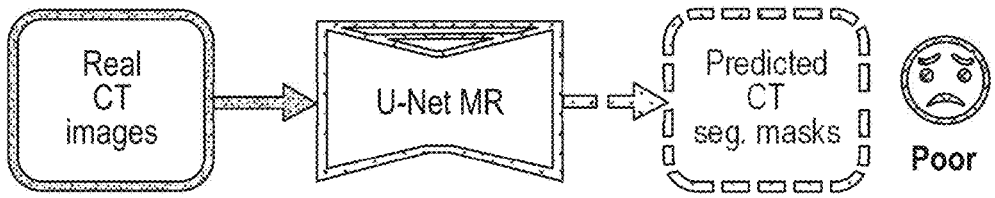
Figure 9B:
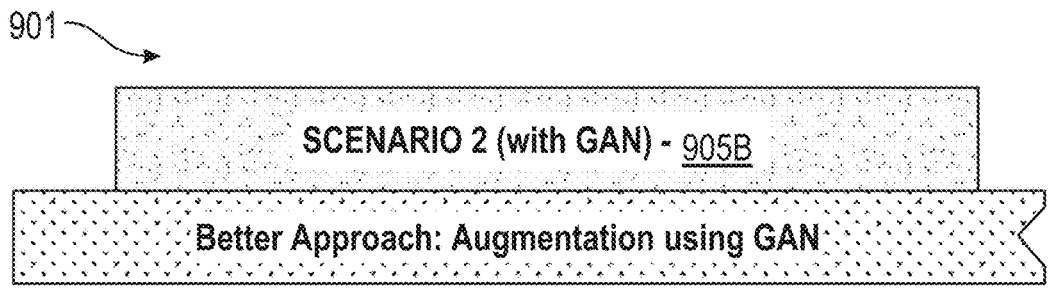
Figure 9B:
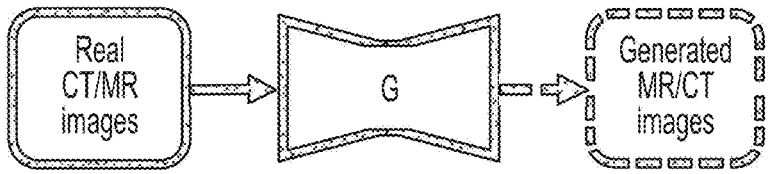
Figure 9B:
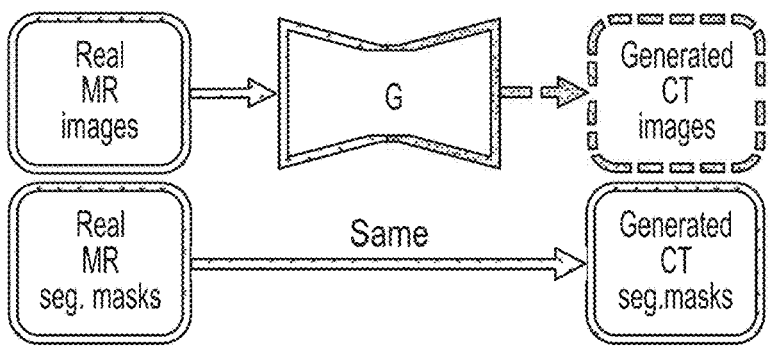
Figure 9B:
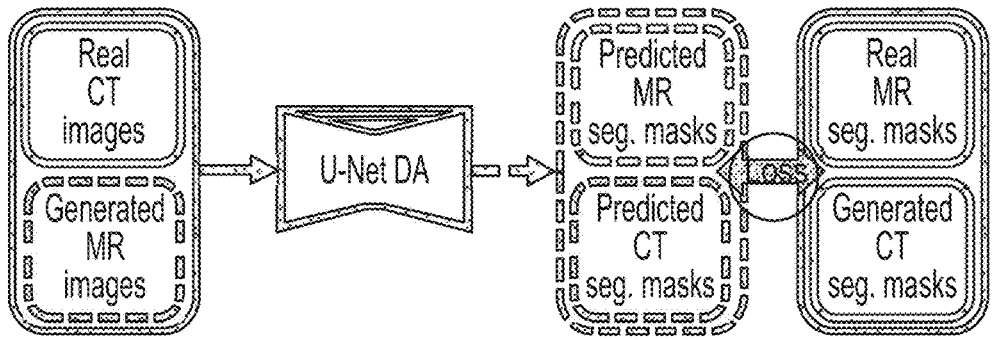
Figure 9B:
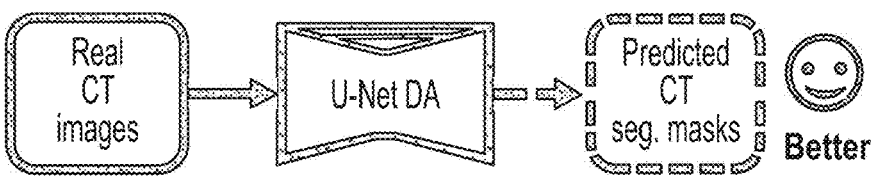

FIGS. 9A and 9B illustrate a proposed scenario 2 processed with and without GAN, respectively, according to a particular embodiment.

As shown here, processing of the CT images at scenario 2 without GAN as depicted by element 905A at FIG. 9A results in a poor segmentation. Conversely, processing of the CT images at scenario 2 with GAN as depicted by element 905B at FIG. 9B provides for a better approach through the use of augmentation using GAN, and thus resulting in a better segmentation result.

As set forth above, a novel concept is introduced called fixed-point translation and a new GAN is developed called Fixed-Point GAN. The comprehensive evaluation detailed above demonstrates that the Fixed-Point GAN outperforms image-to-image translation methods, enhancing the quality of the images generated through global, local, and identity transformation.

As a result, the Fixed-Point GAN has an intrinsic ability to improve many applications dependant on image-to-image translation, for instance, the improved facial attribute modification is illustrated above and the improved semantic segmentation of out-of-distribution data is further described. Moreover, the Fixed-Point GAN as introduced and described herein has unlocked the possibilities of new applications, such as disease detection and localization using just image-level annotations where the Fixed-Point GAN is significantly superior to predominant anomaly detection and weakly-supervised localization methods. The superior performance of Fixed-Point GAN is attributed to the new training scheme, realized by supervising same-domain translation and regularizing cross-domain translation.

Figure 10:
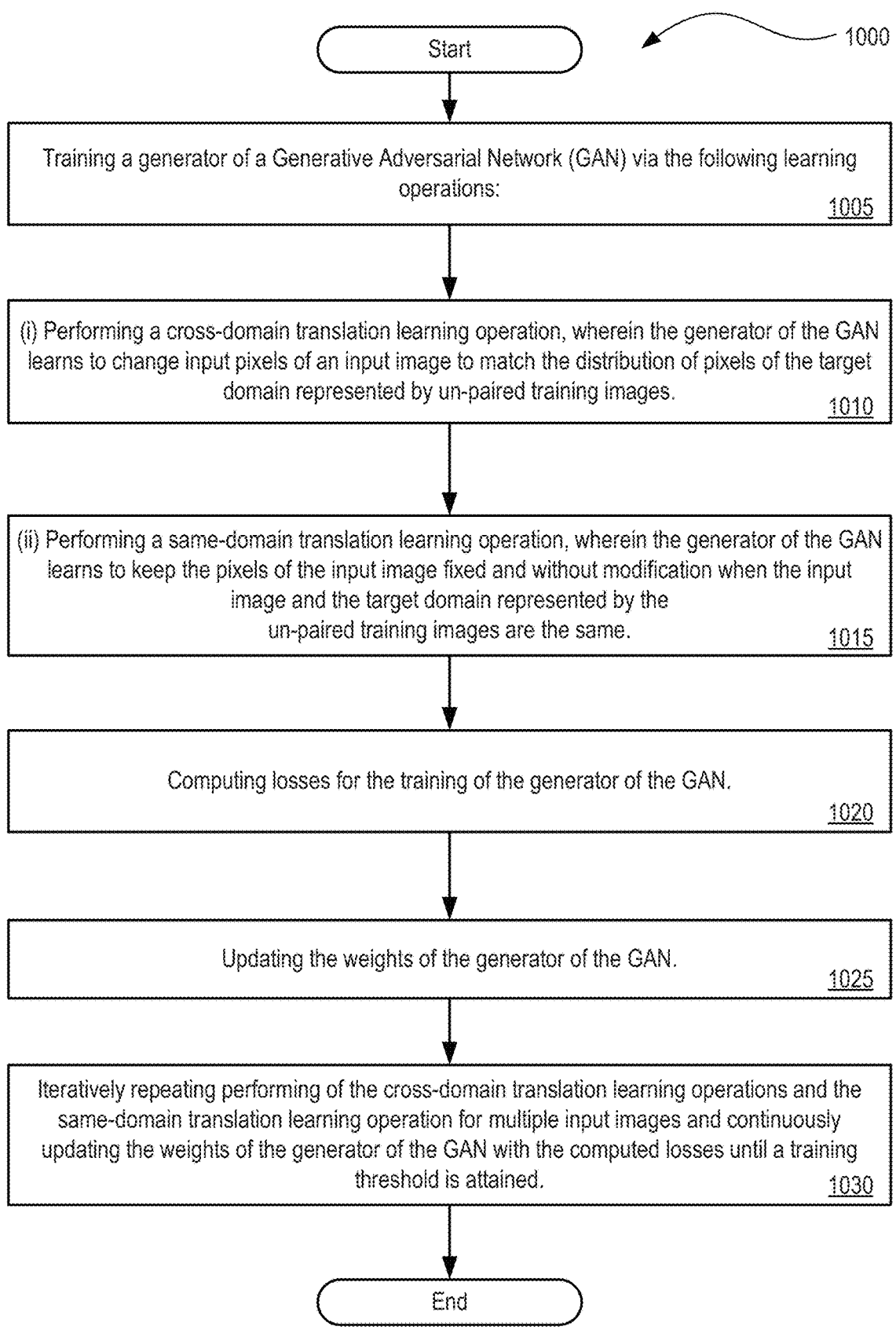
FIG. 10 depicts a flow diagram illustrating a method for implementing fixed-point image-to-image translation using improved Generative Adversarial Networks (GANs), in accordance with disclosed embodiments.

FIG. 10 depicts a flow diagram illustrating a method 1000 for implementing fixed-point image-to-image translation using improved Generative Adversarial Networks (GANs), in accordance with disclosed embodiments. Method 1000 may be performed by processing logic that may include hardware (e.g., circuitry, dedicated logic, programmable logic, microcode, etc.), software (e.g., instructions run on a processing device) to perform various operations such as designing, defining, retrieving, parsing, persisting, exposing, loading, executing, operating, receiving, generating, storing, maintaining, creating, returning, presenting, interfacing, communicating, transmitting, querying, processing, providing, determining, triggering, displaying, updating, sending, etc., in pursuance of the systems and methods as described herein. For example, the system 1101 (see FIG. 11) and the machine 1201 (see FIG. 12) and the other supporting systems and components as described herein may implement the described methodologies. Some of the blocks and/or operations listed below are optional in accordance with certain embodiments. The numbering of the blocks presented is for the sake of clarity and is not intended to prescribe an order of operations in which the various blocks must occur.

With reference to the method 1000 depicted at FIG. 10 beginning at block 1005, there is a method performed by a system having at least a processor and a memory therein to execute instructions which cause the system to train a generator of a Generative Adversarial Network (GAN) via the following learning operations:

At block 1010, processing logic (i) performs a cross-domain translation learning operation, wherein the generator of the GAN learns to change input pixels of an input image to match the distribution of pixels of the target domain represented by un-paired training images.

At block 1015, processing logic (ii) performs a same-domain translation learning operation, wherein the generator of the GAN learns to keep the pixels of the input image fixed and without modification when the input image and the target domain represented by the un-paired training images are the same.

At block 1020, processing logic computes losses for the training of the generator of the GAN.

At block 1025, processing logic updates the weights of the generator of the GAN.

At block 1030, processing logic iteratively repeats the performing of the cross-domain translation learning operations and the same-domain translation learning operation for multiple input images and continuously updating the weights of the generator of the GAN with the computed losses until a training threshold is attained.

According to another embodiment of method 1000, performing the cross-domain translation learning operation removes an object or element from the input image while without modification to regions of the input image unaffected by the inclusion or removal of the object or element in the input image.

According to another embodiment of method 1000, the cross-domain translation learning operation further regularizes the cross-domain translation by keeping pixels unrelated to domain translation fixed.

According to another embodiment of method 1000, performing the same-domain translation learning operation removes generates an identical output image as the input image when there is no object or element to be removed from the input image.

According to another embodiment of method 1000, performing the same-domain translation learning operation by imposing an identity constraint requiring the output and input images to be identical by minimizing the L1 distance between the input and output images.

According to another embodiment of method 1000, a trained GAN model resulting from the iterative training of the GAN meets the following requirements: (i) the trained GAN model handles un-paired images not previously observed during training; (ii) the trained GAN model translates any image to a target domain requiring no source domain; (iii) the trained GAN model performs an identity transformation during same domain translation; (iv) the trained GAN model performs minimal image transformation for cross-domain translation; and (v) the trained GAN model scales efficiently to multi-domain translation.

According to another embodiment of method 1000, wherein a trained GAN model provides disease diagnosis from a diseased medical scan of a patient without any paired healthy medical scan of the same patient.

According to a particular embodiment, there is a non-transitory computer-readable storage media having instructions stored thereupon that, when executed by a system having at least a processor and a memory therein, the instructions cause the system to perform operations including: training a generator of a Generative Adversarial Network (GAN) via the following learning operations: (i) performing a cross-domain translation learning operation, wherein the generator of the GAN learns to change input pixels of an input image to match the distribution of pixels of the target domain represented by un-paired training images, and (ii) performing a same-domain translation learning operation, wherein the generator of the GAN learns to keep the pixels of the input image fixed and without modification when the input image and the target domain represented by the un-paired training images are the same; computing losses for the training of the generator of the GAN; updating the weights of the generator of the GAN; and iteratively repeating performing of the cross-domain translation learning operation and the same-domain translation learning operation for multiple input images and continuously updating the weights of the generator of the GAN with the computed losses until a training threshold is attained.

Figure 11:
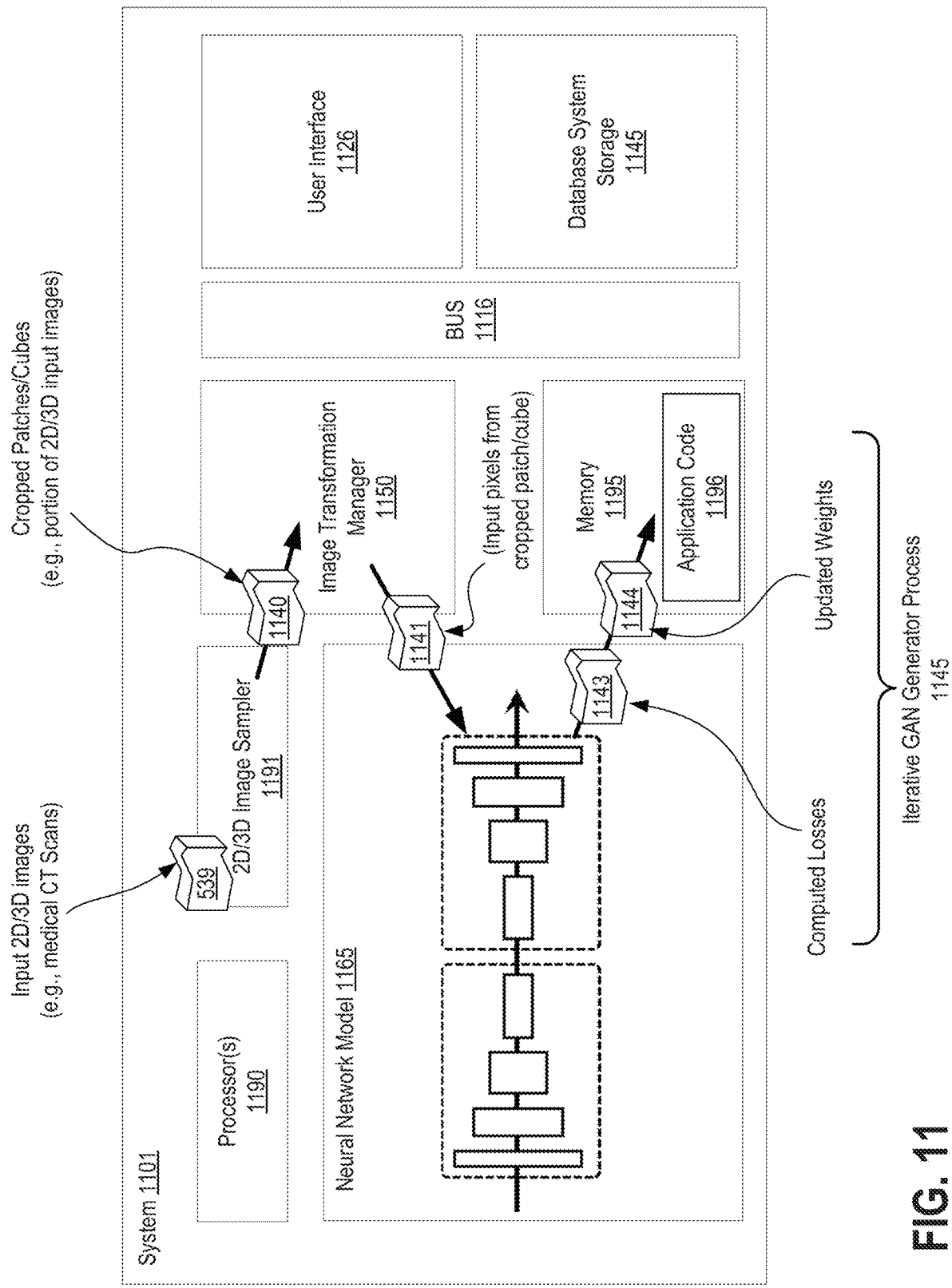
FIG. 11 shows a diagrammatic representation of a system within which embodiments may operate, be installed, integrated, or configured.

FIG. 11 shows a diagrammatic representation of a system 1101 within which embodiments may operate, be installed, integrated, or configured. In accordance with one embodiment, there is a system 1101 having at least a processor 1190 and a memory 1195 therein to execute implementing application code 1196. Such a system 1101 may communicatively interface with and cooperatively execute with the benefit of remote systems, such as a user device sending instructions and data, a user device to receive segmented image 1143 output from the model output manager 1185 of the system, or systems within a networked or within a client-server environment, etc.

According to the depicted embodiment, the system 1101, includes the processor 1190 and the memory 1195 to execute instructions at the system 1101 and wherein the system is specially configured to: execute instructions via the processor for training a generator of a Generative Adversarial Network (GAN) via the following learning operations: (i) performing a cross-domain translation learning operation, wherein the generator of the GAN learns to change input pixels 1141 of an input image to match the distribution of pixels of the target domain represented by un-paired training images, and (ii) performing a same-domain translation learning operation, wherein the generator of the GAN learns to keep the pixels of the input image fixed and without modification when the input image and the target domain represented by the un-paired training images are the same; execute instructions via the processor for computing losses 1143 for the training of the generator of the GAN; execute instructions via the processor for updating the weights 1144 of the generator of the GAN; and execute instructions via the processor for iteratively repeating performing of the cross-domain translation learning operation and the same-domain translation learning operation for multiple input images and continuously updating the weights of the generator of the GAN (e.g., via the iterative GAN generator process 1145) with the computed losses until a training threshold is attained.

An output manager may further transmit output back to a user device or other requestor, for example, via the user interface 1126, including sending a disease classification 1143 output to a user device or other requestor, or such information may alternatively be stored within the database system storage 1145 of the system 1101.

According to another embodiment of the system 1101, a user interface 1126 communicably interfaces with a user client device remote from the system and communicatively interfaces with the system via a public Internet.

Bus 1116 interfaces the various components of the system 1101 amongst each other, with any other peripheral(s) of the system 1101, and with external components such as external network elements, other machines, client devices, cloud computing services, etc. Communications may further include communicating with external devices via a network interface over a LAN, WAN, or the public Internet.

FIG. 12 illustrates a diagrammatic representation of a machine 1201 in the exemplary form of a computer system, in accordance with one embodiment, within which a set of instructions, for causing the machine/computer system 1201 to perform any one or more of the methodologies discussed herein, may be executed. In alternative embodiments, the machine may be connected (e.g., networked) to other machines in a Local Area Network (LAN), an intranet, an extranet, or the public Internet. The machine may operate in the capacity of a server or a client machine in a client-server network environment, as a peer machine in a peer-to-peer (or distributed) network environment, as a server or series of servers within an on-demand service environment. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify and mandate the specifically configured actions to be taken by that machine pursuant to stored instructions. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 1201 includes a processor 1202, a main memory 1204 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 1218 (e.g., a persistent storage device including hard disk drives and a persistent database and/or a multi-tenant database implementation), which communicate with each other via a bus 1230. Main memory 1204 includes an auto encoder network 1224 and an iterative GAN generator 1223 as well as the resulting trained model 1225 (e.g., a trained AI model) resulting from the iterative training and weights updating in support of the methodologies and techniques described herein. Main memory 1204 and its sub-elements are further operable in conjunction with processing logic 1226 and processor 1202 to perform the methodologies discussed herein.

Processor 1202 represents one or more specialized and specifically configured processing devices such as a microprocessor, central processing unit, or the like. More particularly, the processor 1202 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 1202 may also be one or more special-purpose processing devices such as an application-specific integrated circuit (ASIC), a field programmable gate array (FPGA), a digital signal processor (DSP), network processor, or the like. Processor 1202 is configured to execute the processing logic 1226 for performing the operations and functionality which is discussed herein.

The computer system 1201 may further include a network interface card 1208. The computer system 1201 also may include a user interface 1210 (such as a video display unit, a liquid crystal display, etc.), an alphanumeric input device 1212 (e.g., a keyboard), a cursor control device 1213 (e.g., a mouse), and a signal generation device 1216 (e.g., an integrated speaker). The computer system 1201 may further include peripheral device 1236 (e.g., wireless or wired communication devices, memory devices, storage devices, audio processing devices, video processing devices, etc.).

The secondary memory 1218 may include a non-transitory machine-readable storage medium or a non-transitory computer readable storage medium or a non-transitory machine-accessible storage medium 1231 on which is stored one or more sets of instructions (e.g., software 1222) embodying any one or more of the methodologies or functions described herein. The software 1222 may also reside, completely or at least partially, within the main memory 1204 and/or within the processor 1202 during execution thereof by the computer system 1201, the main memory 1204 and the processor 1202 also constituting machine-readable storage media. The software 1222 may further be transmitted or received over a network 1220 via the network interface card 1208.

While the subject matter disclosed herein has been described by way of example, and in terms of the specific embodiments, it is to be understood that the claimed embodiments are not limited to the explicitly enumerated embodiments disclosed. On the contrary, the disclosure is intended to cover various modifications and similar arrangements as are apparent to those skilled in the art. Therefore, the scope of the appended claims is to be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is, therefore, to be determined in reference to the appended claims, along with the full scope of equivalents to which such claims are entitled.

What is claimed is:

1. A method for training a Generative Adversarial Network (GAN) to detect a diseased region in a medical image of a patient, performed by a system having at least a processor and a memory therein to execute instructions to carry out the method, comprising:
   receiving an input medical image of the patient, the input medical image comprising a plurality of pixels;
   training a generator of the GAN via the following learning operations:
   (i) performing a cross-domain translation learning operation, wherein the generator of the GAN learns to change only a portion of the plurality of pixels representing a diseased region when present in the input medical image, and not change any other pixels in the input medical image, to match a distribution of pixels in a target domain represented by un-paired training images, and
   (ii) performing a same-domain translation learning operation, wherein the generator of the GAN learns to not change any pixels in the input medical image when a diseased region is absent in the input medical image so that the pixels in the input medical image match the distribution of pixels in the target domain represented by the un-paired training images;
   computing losses for the training of the generator of the GAN;
   updating a plurality of weights of the generator of the GAN; and
   iteratively repeating, for multiple input medical images, performing the cross-domain translation learning operation, performing the same-domain translation learning operation, computing losses for the training of the generator of the GAN, and updating the plurality of weights of the generator of the GAN until a training threshold is attained.

2. The method of claim 1, wherein performing the cross-domain translation learning operation removes the diseased region when present in the input medical image without modifying other regions of the input medical image.

3. The method of claim 1, wherein the cross-domain translation learning operation further regularizes the cross-domain translation learning operation by not changing any other pixels in the input medical image not representing the diseased region when present in the input medical image.

4. The method of claim 1, wherein performing the same-domain translation learning operation generates an output image identical to the input image.

5. The method of claim 4, wherein performing the same-domain translation learning operation imposes an identity constraint requiring the output image to be identical to the input image by minimizing a distance $L_1$ between the input image and the output image.

6. The method of claim 1, wherein the method generates a trained GAN model that:
   (i) handles un-paired training images not previously observed during training;
   (ii) translates any input medical image to a target domain requiring no source domain;
   (iii) performs an identity transformation during same-domain translation;
   (iv) performs minimal input medical image transformation for cross-domain translation; and
   (v) scales efficiently to multi-domain translation.

7. The method of claim 1, wherein a trained GAN model provides disease diagnosis from the diseased region in the medical image of the patient without any paired healthy medical image of the patient.

8. Non-transitory computer-readable storage media having instructions stored thereupon that, when executed by a system having at least a processor and a memory therein, the instructions cause the system to perform operations including:
   receiving an input medical image of a patient, the input medical image comprising a plurality of pixels;
   training a generator of a Generative Adversarial Network (GAN) to detect a diseased region in the medical image of the patient via the following learning operations:
   (i) performing a cross-domain translation learning operation, wherein the generator of the GAN learns to change only a portion of the plurality of pixels representing a diseased region when present in the input medical image, and not change any other pixels in the input medical image, to match a distribution of pixels in a target domain represented by un-paired training images, and
   (ii) performing a same-domain translation learning operation, wherein the generator of the GAN learns to not change any pixels in the input medical image when a diseased region is absent in the input image so that the pixels in the input medical image match the distribution of pixels in the target domain represented by the un-paired training images;
   computing losses for the training of the generator of the GAN;
   updating a plurality of weights of the generator of the GAN; and
   iteratively repeating, for multiple input medical images, performing the cross-domain translation learning operation, performing the same-domain translation learning operation, computing losses for the training of the generator of the GAN, and updating the plurality of weights of the generator of the GAN until a training threshold is attained.

9. The non-transitory computer-readable storage media of claim 8, wherein performing the cross-domain translation learning operation removes from the diseased region when present in the input medical image without modifying other regions of the input medical image.

10. The non-transitory computer-readable storage media of claim 8, wherein the cross-domain translation learning operation further regularizes the cross-domain translation learning operation by not changing any other pixels in the input medical image not representing the diseased region when present in the input medical image.

11. The non-transitory computer-readable storage media of claim 8, wherein performing the same-domain translation learning operation generates an output image identical to the input image.

12. The non-transitory computer-readable storage media of claim 11, wherein performing the same-domain translation learning operation imposes an identity constraint requiring the output image to be identical to the input by minimizing a distance $L_1$ between the input image and the output image.

13. The non-transitory computer-readable storage media of claim 8, wherein instructions cause the system to generate a trained GAN model that:
 (i) handles un-paired images not previously observed during training;
 (ii) translates any image to a target domain requiring no source domain;
 (iii) performs an identity transformation during same domain translation;
 (iv) performs minimal image transformation for cross-domain translation; and
 (v) scales efficiently to multi-domain translation.

14. The non-transitory computer-readable storage media of claim 8, wherein a trained GAN model provides disease diagnosis from the diseased region in the medical image of the patient without any paired healthy medical image of the patient.

15. A system comprising:
 a memory to store instructions;
 a processor to execute the instructions stored in the memory;
 wherein the system is specially configured to:
 execute the instructions via the processor for receiving an input medical image of a patient, the input medical image comprising a plurality of pixels;
 execute the instructions via the processor for training a generator of a Generative Adversarial Network (GAN) to detect a diseased region in the medical image of the patient via the following learning operations:
 (i) performing a cross-domain translation learning operation, wherein the generator of the GAN learns to change only a portion of the plurality of pixels representing a diseased region when present in the input medical image, and not change any other pixels in the input medical image, to match a distribution of pixels in a target domain represented by un-paired training images, and
 (ii) performing a same-domain translation learning operation, wherein the generator of the GAN learns to not change any pixels in the input medical image when a diseased region is absent in the input medical image so that the pixels in the input medical image match the distribution of pixels in the target domain represented by the un-paired training images;
 execute the instructions via the processor for computing losses for the training of the generator of the GAN;
 execute the instructions via the processor for updating a plurality of weights of the generator of the GAN; and
 execute the instructions via the processor for iteratively repeating, for multiple input medical images, performing the cross-domain translation learning operation, performing the same-domain translation learning operation, computing losses for the training of the generator of the GAN, and updating the plurality of weights of the generator of the GAN until a training threshold is attained.

16. The system of claim 15, wherein performing the cross-domain translation learning operation removes the diseased region when present in the input medical image without modifying other regions of the input medical image.

17. The system of claim 15, wherein the cross-domain translation learning operation further regularizes the cross-domain translation learning operation by not changing any other pixels in the input medical image not representing the diseased region when present in the input medical image.

18. The system of claim 15, wherein performing the same-domain translation learning operation generates an output image identical to the input image.

19. The system of claim 18, wherein performing the same-domain translation learning operation imposes an identity constraint requiring the output image to be identical to the input image by minimizing a distance $L_1$ between the input image and the output image.

20. The system of claim 15, wherein the system generates a trained GAN model that:
 (i) handles un-paired images not previously observed during training;
 (ii) translates any image to a target domain requiring no source domain;
 (iii) performs an identity transformation during same domain translation;
 (iv) performs minimal image transformation for cross-domain translation;
 (v) scales efficiently to multi-domain translation; and
 (vi) that provides disease diagnosis from the diseased region in the medical image of the patient without any paired healthy medical image of the patient.

* * * * *